(12) United States Patent
Bae

(10) Patent No.: US 7,413,147 B2
(45) Date of Patent: Aug. 19, 2008

(54) SYSTEM AND METHOD FOR PROPELLANTLESS PHOTON TETHER FORMATION FLIGHT

(76) Inventor: Young Kun Bae, 218 W. Main St., Suite 102, Tustin, CA (US) 92780

( * ) Notice: Subject to any disclaimer, the term of this patent is extended or adjusted under 35 U.S.C. 154(b) by 67 days.

(21) Appl. No.: 11/491,830

(22) Filed: Jul. 22, 2006

(65) Prior Publication Data
US 2007/0045474 A1    Mar. 1, 2007

Related U.S. Application Data

(60) Provisional application No. 60/710,544, filed on Aug. 23, 2005.

(51) Int. Cl.
  *B64G 1/24*   (2006.01)
(52) U.S. Cl. .................. 244/164; 244/158.2; 244/171.5
(58) Field of Classification Search ............ 244/158.2, 244/171.5, 164
  See application file for complete search history.

(56) References Cited

U.S. PATENT DOCUMENTS

| | | | |
|---|---|---|---|
| 6,646,723 B1 | 11/2003 | Dubovitsky et al. | |
| 6,721,658 B2 | 4/2004 | Stadter et al. | |
| 6,936,760 B2 * | 8/2005 | Rogers et al. | 136/246 |
| 7,118,075 B2 * | 10/2006 | Schubert | 244/169 |
| 7,207,525 B2 * | 4/2007 | Bischof et al. | 244/172.6 |

OTHER PUBLICATIONS

Cash. W., "X-ray Interferometry-Ultimate Imaging," NIAC Phase II Final Report, (2002), www.niac.usra.edu, accessed Jul. 10, 2005.
Leitner, J., "Formation Flying—The Future of Remote Sensing from Space," NASA Report, (2004), www.issfd.dlr.de/papers/P0001.pdf, accessed Nov. 11, 2004.
Lardiere, O., Labeyrie, A., Gillet, S., Riaud, P, (2002), http://www.arcetri.astro.it/~lardiere/publi/2001-Lardiere-haifa.pdf, accessed Apr. 10, 2006.
LaPointe, M. R., "Formation Flying with Shepherd Satellites," NIAC Phase I Final Report, (2001), www.niac.usra.edu, accessed Jul. 10, 2005.
LaPointe, M. R., "Formation Flying with Shepherd Satellites," NIAC Phase I Final Report, (2001), www.niac.usra.edu, accessed Jul. 10, 2005.
King, L. B., Parker, G. G., Deshmukh, and S., Chong, J., "Spacecraft Formation-Flying using Inter-Vehicle Coulomb Forces," NIAC Phase I Final Report, (2002), www.niac.usra.edu.

(Continued)

*Primary Examiner*—John W Eldred
(74) *Attorney, Agent, or Firm*—Jafari Law Group, Inc.; David V. Jafari

(57) ABSTRACT

The invention is a system and method for propellantless, ultrahigh precision satellite formation flying based on ultrahigh precision intracavity laser thrusters and tethers with an intersatellite distance accuracy of nanometers at maximum estimated distances of tens of kilometers. The repelling force of the intracavity laser thruster and the attracting force of tether tension between satellites form the basic forces to stabilize matrix structures of satellites. Users of the present invention can also use the laser thruster for ultrahigh precision laser interferometric metrology, resulting in simplification and payload weight reduction in integrating the thruster system and the metrology system.

52 Claims, 13 Drawing Sheets

OTHER PUBLICATIONS

Jeganathan, M., and Dubovitsky, S., "Demonstration of nm-level Active . . . ," Proc. SPIE vol. 4006, SPIE, Bellingham, WA, 2000, pp. 838-846.g.

Cosmo, M.L., Lorenzini, E.C., "Tethers in Space Handbook," 1997.

Cash, W., "X-ray Interferometry-Ultimate Imaging," NIAC Phase II Final Report, (2002), www.niac.usra.edu, accessed Jul. 10, 2005.

Cash, W., "New Worlds Imager," NIAC Phase I Final Report, (2005), www.niac.usra.edu, accessed Dec. 10, 2005.

Miller, D. W., and Sedwick, R. J., "Electromagnetic Formation Flight," NIAC Phase I Final Report, (2003), www.niac.usra.edu, accessed Jul. 10, 2005.

Palisoc, A.L, "Large Telescope Using a Holographically-Corrected Membrane Mirror," NIAC Phase I Final Report, (2000), www.niac.usra.edu, accessed Oct. 15, 2005.

Schielen. E., and Riedl, M., "Diode-Pumped Intracavity Frequency Doubled Semiconductor Disk Laser with Improved Output Beam Properties," Annual Report, (2002), Opto-electronic Dept., Univ. of Ulm, www.opto.e-technik.uni-ulm.de, accessed Oct. 11, 2004.

Schnopper, "Ultarhigh Resolution Fourier Transform X-ray Interferometer," NIAC Fellow Meeting Presentation (2006), http://niac.usra.edu/files/library/meetings/fellows/mar06/1138Schnopper.pdf, accessed Mar. 12, 2006.

Bae, Young K. "A Contamination-Free Ultrahigh Precision Formation Flying Method for Micro-, Nano, and Pico-Satellites with Nanometer Accuracy," Space Technology and Applications International Forum, edited by M.S. El-Genk, AIP Conf. Proc. AP813, 2006, pp. 1213-1223.

* cited by examiner

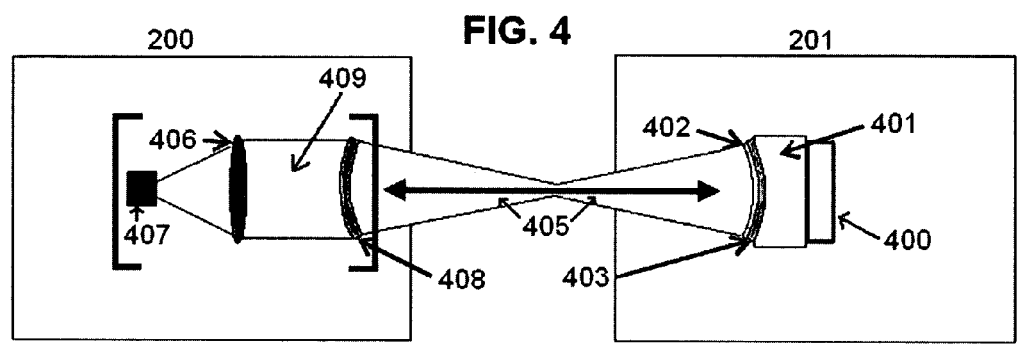
FIG. 4
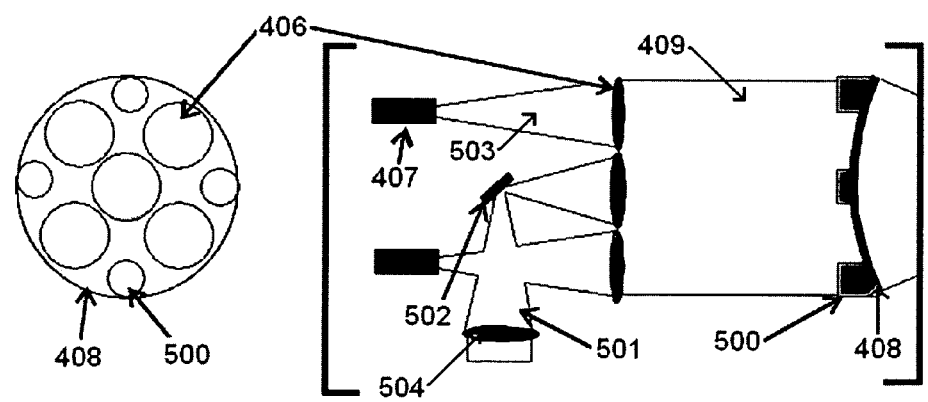
FIG. 6
FIG. 5

| Maximum Operation Laser Power (extracavity) | HR Mirror Reflectance | Maximum Theoretical Thrust |
|---|---|---|
| 10 W | 0.90 - 0.99 (commonly used in laser cavities) | 0.67 - 6.7 µN |
| 10 W | 0.9997 (Newport Supermirror) | 220 µN |
| 10 W | 0.9999 (research grade) | 0.67 mN |
| 10 W | 0.99995 (typically used super mirror) | 1.34 mN |

SYSTEM AND METHOD FOR PROPELLANTLESS PHOTON TETHER FORMATION FLIGHT

PRIORITY NOTICE

The present application claims priority, under 35 USC §199(e) and under 35 USC §120, to the U.S. Provisional Patent with Application Ser. No. 60/710,544 filed Aug. 23, 2005, the disclosure of which is incorporated herein by reference in its entirety.

COPYRIGHT & TRADEMARK NOTICE

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or to limit the scope of this invention to material associated only with such marks.

TECHNICAL FIELD OF THE INVENTION

The present invention relates in general to precision formation flying, and in particular to ultrahigh precision satellite formation flying with laser and tether technology.

BACKGROUND OF THE INVENTION

The advent of micro-satellite and nano-satellite technology has provided an opportunity to insert sophisticated sensors and processing technologies into orbits of interest at low costs. Building a cluster of small satellites is generally cheaper, more robust, and more versatile than building one, large, monolithic satellite. Additionally, precision formation flying is critical to enable remote sensing space stations to improve both resolution and surface area coverage by orders of magnitude. Another advantage to precision formation flying of multiple nano-satellites is that it allows launch vehicles with small size limitations to assemble large, steady mirror apertures or large sample collection areas. For example, ultrahigh precision satellite clusters can be used for advanced geophysical monitoring to measure and monitor small changes in the movement of earthquake plates and gravity wave detection, whereas current GPS and standard laser range finders cannot. In another example, ultrahigh precision satellite clusters can be used for structuring large space telescopes and spectrometers for observing and characterizing earth-bound activities as well as near-earth orbit asteroids and comets.

Technology that depends on formation flying of nano-satellites critically depends on creating and maintaining precise formations. The least stringent requirements may require two satellites meters apart to maintain distance accuracy of 1 centimeter and a relative bearing of 1 arcminute while the most stringent requirements may require multiple satellites stationed kilometers apart to maintain distance accuracy of 1 nanometer and a relative bearing of 1 micro-arcsecond.

For example, one of the most challenging applications for formation flying thus far is that of the proposed MicroArcsecond X-ray Imaging Mission (MAXIM) project. According to the full MAXIM concept, the relative distance between the hub satellite and collector satellites needs to be precisely maintained within a few nanometers tolerance with a distance of approximately 200 meters between the satellites. The provision requirement for maintaining this distance, therefore, is 10 parts per trillion distance units. Most of the conventional propellant-based propulsion systems would not be able to handle this type of precision, such as gas hydrazine thrusters, pulsed plasma thrusters, hall thrusters, electrostatic ion engines, and field emission electron propulsion systems. Additionally, even if such thrusters were minimized to provide smaller, more accurate bursts of thrust, there remains a strong concern that the resulting propellant exhaust plumes may contaminate sensors and associated windows and optics.

To alleviate these concerns, several propellant-less formation flying methods have been proposed. Propulsive conducting tethers and spin-stabilized tether systems have been proposed in place of on-board propulsion systems to form and maintain satellite formations. Additional minimal thrust requirements can be handled through techniques such as the microwave scattering concept, the Coulomb force concept, and the magnetic dipole interaction concept. While such concepts offer intriguing possibilities for small arrays consisting of only a few spacecraft, implementing a system for dozens of satellites over large distances quickly becomes problematic.

For example, microwave scattering requires very high power consumption, requires large antenna arrays, and the scattered microwaves may electronically interfere with neighboring satellites. The Coulomb control system is limited to close formation (less than 50 m) plasma environments characterized by Debye lengths greater than the inter-vehicle separation, and requires very high voltage discharges which, in addition to consuming large amounts of energy, can damage instruments or throw off the accuracy of such instruments due to electrostatic discharge. The magnetic dipole interaction concept also requires close formations, and requires a very bulky and heavy system on the magnitude of several tons.

Therefore, there is a need in the art for a system and method to implement a system and a method for implementing satellite formation flying which is propellant-less, requires low power, is lightweight, uses little space, and provides for ultrahigh precision control of the distance and bearing between satellites.

SUMMARY OF THE INVENTION

To minimize the limitations in the prior art, and to minimize other limitations that will be apparent upon reading and understanding the present specification, the present invention describes a system and a method for propellantless satellite formation flying based on continuous wave intracavity laser thrusters and tethers.

A method in accordance with the present invention comprises attaching a laser thrust system to said first apparatus and said second apparatus, activating said laser thrust system, wherein said laser thrust system provides a repelling force that repels said first apparatus and said second apparatus away from one another, and attaching a tether system to said first apparatus and said second apparatus, wherein said tether system provides an attracting force that attracts said first apparatus and said second apparatus towards one another, wherein said repelling force and said attracting force are equal to stabilize said distance of said first apparatus and said second apparatus.

A system in accordance with the present invention comprises a first satellite, a second satellite, positioned opposite said first satellite, a laser thrust system for providing a repelling force that repels said first satellite away from said second satellite, and a tether system for providing an attracting force that attracts said first satellite towards said second satellite It is an object of the present invention to provide propellantless thrusters for a satellite system to prevent potential contamination or damage by propellant exhaust fumes.

It is another object of the present invention to provide propellantless thrusters for a satellite system with low power requirements.

It is yet another object of the present invention to provide propellantless thrusters for a satellite system that does not produce potentially harmful electrostatic discharge.

It is yet another object of the present invention to provide propellantless thrusters for a satellite system with minimum mass.

It is yet another object of the present invention to provide only one source for creating both thrust and for measuring a distance between two satellites.

It is yet another object of the present invention to measure the distance between two satellites within the accuracy of a nanometer.

It is yet another object of the present invention to be able to change the opposing thrust between two satellites within the accuracy of a pico-Newton.

It is yet another object of the invention to use a plurality of lasers mounted on satellites for slewing.

It is yet another object of the present invention to provide a propellantless thruster and tether system for a satellite system where the distance between satellites could be maintained within a nanometer.

It is yet another object of the present invention to combine components of a thrust system and an interferometry measurement system.

These and other advantages and features of the present invention are described herein with specificity so as to make the present invention understandable to one of ordinary skill in the art.

BRIEF DESCRIPTION OF THE DRAWINGS

FIG. 4 is a schematic diagram of a laser thrust system in accordance with one embodiment.

FIG. 5 is a close up view of one satellite in FIG. 4, showing the details of subsystems.

FIG. 6 is a close up perspective view of the mirror of FIG. 5.

DETAILED DESCRIPTION OF THE DRAWINGS

In the following discussion, reference is made to the accompanying drawings that form a part hereof, and in which is shown by way of illustration specific embodiments in which the invention may be practiced. It is to be understood that other embodiments may be utilized and changes may be made without departing from the scope of the invention.

The following detailed description describes a revolutionary formation flying method, Photon Tether Formation Flight (PTFF), which enables ultrahigh precision spacecraft and satellite formation flying with an intersatellite distance accuracy of nanometers at maximum estimated distances on the order of tens of kilometers. This system and method is based on an innovative ultrahigh precision intracavity laser thruster able to provide continuously adjustable thrust with very high accuracy, for example pico-Newtons, between spacecraft and satellites held together by tethers. This system and method can also be combined with an inteferometry system to maintain a distance with very high accuracy, for example nanometers.

PTFF can be used for numerous commercial and defense applications, as well as most of the next generation NASA formation flying missions envisioned so far. The proposed PTFF design is based on the attracting force provided by tether tension, and the repelling thrust of an intracavity laser thruster. Laser thrust and tension of tethers form a backbone linear force structure of a crystalline-like structured formation flying, and can rapidly damp perturbation from space environmental sources, for example solar pressure, drag-force, and temperature fluctuation, applied from any direction.

Figure 1:
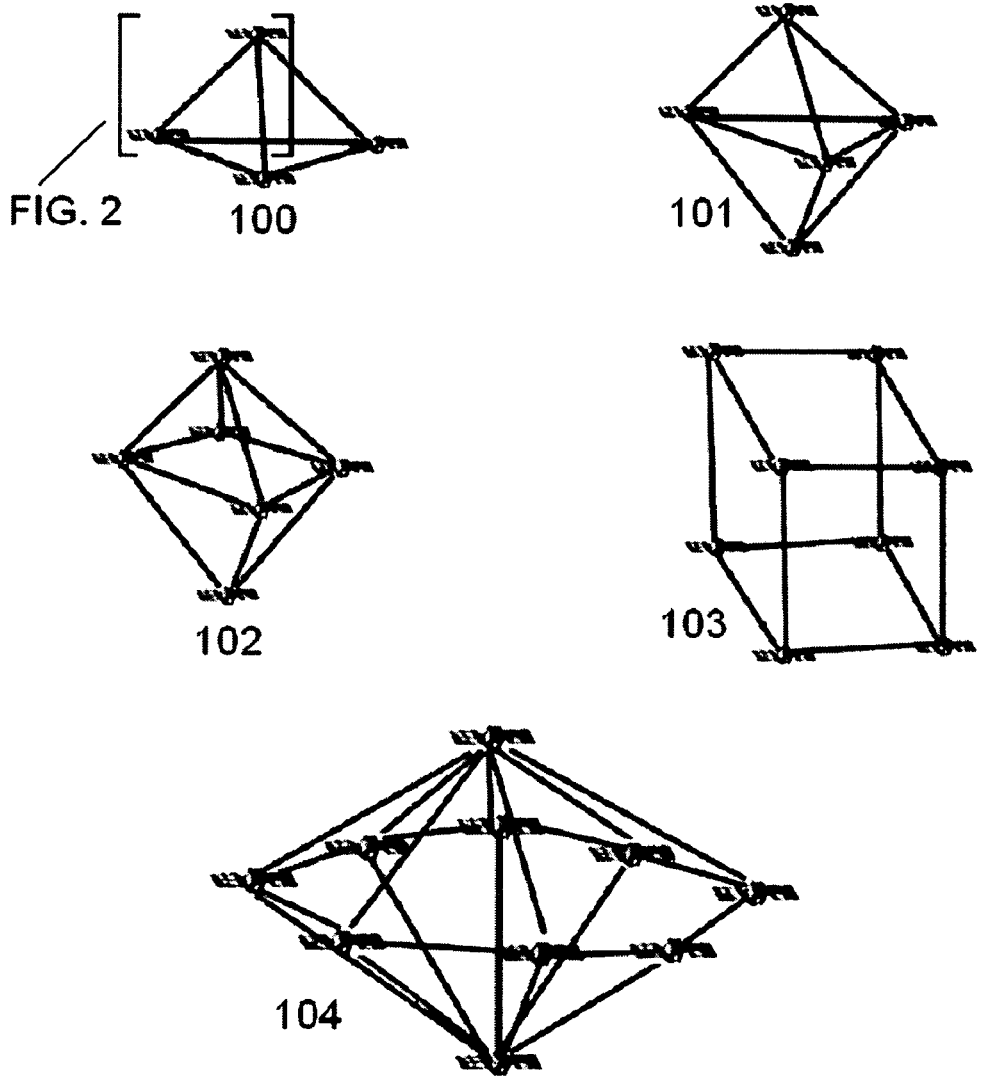
FIG. 1 illustrates schematic diagrams of exemplary satellite mission configurations in accordance with one embodiment.

FIG. 1 illustrates schematic diagrams of exemplary satellite mission configurations in accordance with one embodiment.

FIG. 1 depicts a 4-satellite constellation 100, a 5-satellite constellation 101, a 6-satellite constellation 102, an 8-satellite constellation 103, and a 10-satellite constellation 104. Each constellation depicts a different embodiment showing different ways PTFF technology can be applied in space. A tetrahedral 4-satellite constellation 100 can be used for NASA's Sub-millimeter Probe of the Evoultion of Cosmic Structure (SPECS) mission, for example. An elongated polygon bipyramidal structure similar to 10-satellite constellation 104 can be used for NASA's Micro-Arcsecond X-ray Imaging Mission (MAXIM) applications, for example.

In one embodiment, where the tetrahedral 4-consellation 100 is modified for NASA's SPECS applications, usage of PTFF to keep satellites in a matrix structure obviates the need for a massive amount of thruster propellant. Laser thrusters and tethers can perform almost all the work in moving around satellites while maintaining accurate relative positions towards one another. Additionally, SPECS uses cryogenic optics maintained at 4° K. Temperature contamination and debris contamination of these optical surface is a large concern. A PTFF system can be used in order to counter these concerns.

In another embodiment, where the 10-satellite constellation 104 is modified for NASA's MAXIM applications, the 8 satellites in the middle plane are replaced with 32 collector spacecrafts, and the two apex satellites at the top and bottom of the illustration will be replaced by the hub and converger crafts. In this embodiment, the approximate distance between the hub and collector spacecrafts is about 100 m, and the approximate distance between the converger crafts and collector spacecrafts is approximately 10 km.

Various embodiments include numerous other structures, for example linear dumbbell, triangular and fullerene structures, without departing from the scope of the present invention. Satellite pairs can have more than one tether system for each laser thruster system to stabilize both distance and relative angles between satellites without departing from the scope of the present invention. For some structures where angular disturbance and position accuracy is of major concern, multiple laser thrusters and tethers can be added to increase stability and accuracy.

Figure 2:
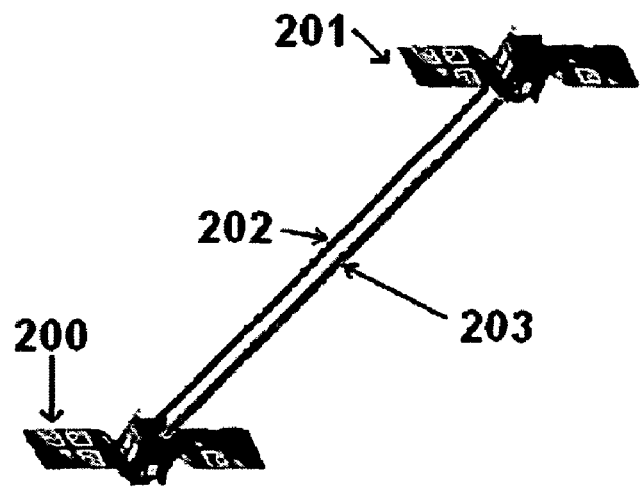
FIG. 2 is an exploded view of two satellites in FIG. 1.

FIG. 2 is an exploded view of two satellites in FIG. 1.

FIG. 2 depicts a first satellite 200, a second satellite 201, a tether 202, and a laser thruster 203. The PTFF system can be used for both spinning and non-spinning systems. In slowly spinning systems, centrifugal force can provide a precise repulsive force, allowing a tether 202 of low mass to provide precise control of the distance between satellite 200 and satellite 201. However, there is a problem as to how quickly distance can be changed without risk of inducing undesired resonances. To solve the problem, satellite 200 and satellite 201 can use laser thruster 203's adjustable laser power rather than mechanical tether length control as the primary control mechanism to adjust the distance between satellite 200 and satellite 201. In non-spinning systems, centrifugal force is not available, and laser thruster 203 will provide the major repulsive force. In both spinning and non-spinning cases, the fast feedback possible through laser thruster 203 can be used not only to control position, but also to reduce the required agility of control of tether 202, and hence problems induced by undesired tether resonances.

In the illustrated formation flying method, the formation is held static by the attracting force provided by tether tension of tether 202, and the repelling continuous wave thrust of laser thruster 203. Although the thrust produced by single bounces of photons is typically negligibly small, the PTFF intracavity design (discussed below) allows photons to bounce between two mirrors as many times as tens of thousands, resulting in several orders of magnitude amplification of the thrust with a laser thruster 203. With this method, distance between satellite 200 and satellite 201 can be adjusted and maintained rapidly to the accuracy of a nanometer. The opposing forces of laser thruster 203 and tether 202 not only form the backbone of the matrix structure, but can also counter perturbations caused by, for example, solar pressure, drag-force, and temperature fluctuation, which are applied from any direction. In some embodiments of the present invention, multiple laser thrusters and tethers are necessary for a pair of satellites to stabilize angular disturbance.

The thrust of the photons are amplified by as much as 20,000 times by bouncing them between two mirrors located separately between paired satellites. A 10 W laser thruster, which is suitable for microsatellite formation flying, is capable of providing thrusts up to 1.34 micro-Newtons with currently available components. This thruster efficiency well rivals that of the most efficient electric propulsion system. A crystalline-like structure of satellites is proposed to be formed by the repelling force of intracavity lasers and the attracting force of tether tension between satellites.

Figure 3:
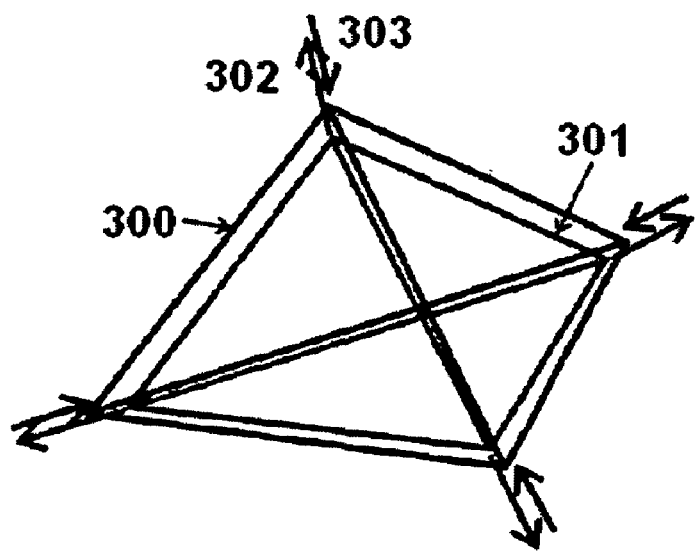
FIG. 3 illustrates opposing forces involved in a formation flying system in accordance with one embodiment.

FIG. 3 illustrates opposing forces involved in a formation flying system in accordance with one embodiment.

FIG. 3 depicts a tether structure 300, a laser thrust structure 301, an outward laser thrust 302, and an inward tether tension 303. In this crystalline-like structure with four satellites, multiple laser thrust forces can combine to create a total outward laser thrust 302, and multiple tethers can combine to create a total inward tether tension 303. In this fashion, not only can one-dimensional line formations be created using PTFF, but two-dimensional, and even three-dimensional matrices, can be created, maintained, and controlled. At minimum, to create a PTFF, two satellites should have a laser thrust system mounted, and a tether connecting both satellites.

FIG. 4 is a schematic diagram of a laser thruster system in accordance with one embodiment.

FIG. 4 depicts a first satellite 200, a second satellite 201, a pump source 400, a pump laser beam 401, a laser gain media 402, first mirror 403, second mirror 408, an intracavity laser beam 404, a laser thrust 405, a lens 406, a laser power meter 407, and an extracavity laser beam 409. In an embodiment of the present invention, pump source 400 emits energy beam 401 towards a back of first mirror 403. Pump laser beam 401 pumps, or energizes laser gain media 402, which increases the optical gain of pump laser beam 401. Pump laser beam 401 shines through a back of first mirror 403 towards second mirror 408. A majority of intracavity laser beam 404 bounces off second mirror 408 towards first mirror 409, and so on and so forth, amplifying laser thrust 405. A small amount of intracavity laser beam 404 may transmit through second mirror 408, and can be focused through lens 406 to laser power meter 407 in order to measure the strength of intracavity laser beam 404. Below each component is described in greater detail.

Pump source 400 can be electricity, a flash lamp, another laser, an electron beam, or any other appropriate pump source without departing from the scope of the present invention. In an exemplary embodiment, pump source 400 comprises a laser diode or a flash lamp. Pump source 400 can be operated in either continuous wave or pulsed fashion, and the precision timing for the duration of powering the continuous wave laser or the pulse length of a pulsed laser can be controlled by, for example, a precision digital clock (not shown). In an exemplary embodiment, pump source 400 is a laser diode operating in continuous wave fashion so as to prevent perturbations from repeated photon pulses.

In the illustrated embodiment, a high percentage of laser beam 401 transmits through a back of first mirror 403 through laser gain media 402 to form intracavity beam 405. The percentage of laser beam 401 which transmits through first mirror 403 depends on the quality of mirror 403. Laser gain media 402 can be positioned behind or in front of first mirror 403 without departing from the scope of the present invention. Laser gain media 402 can also be attached to, or separated from first mirror 403 without departing the scope of the present invention. Laser gain media 402 can additionally be a gas, a dye, a metal-vapor, a solid state, a semiconductor, or any other type of laser gain media without departing from the scope of the present invention. In an exemplary embodiment of the invention, laser gain media 402 is a solid state laser crystal, for example Nd:YAG, but can also be Er:YAG, Nd:YLF, Nd:YCa$_4$O, Nd:Glass, Ti:sapphire, Tm:YAG, Yb:YAG, Ho:YAG, Ce:LiCAF, U:CaF$_2$, Sm:CaF$_2$, Nd:YVO$_4$ or any other solid state laser crystal without departing from the scope of the present invention.

In one embodiment, laser gain media 402 is very thin to minimize absorption loss. In this embodiment, the thin laser gain media 402 is end or side pumped by one or more laser diodes or laser diode arrays as pump source 400. Typically, such a formation can produce power output of at least 10 W, although less or more power can be produced without departing from the scope of the present invention. When laser gain media 402 is so thin, thermal management of laser gain media 402 may become an important issue. In this embodiment, laser gain media 402 can be attached to or grown on first mirror 403. In one embodiment of the invention, laser gain media 402 is cooled in order to maintain a given temperature threshold.

If pump source 400 is a strong laser, laser gain media 402 may be left out of an embodiment without departing the scope of the present invention.

Figure 7:
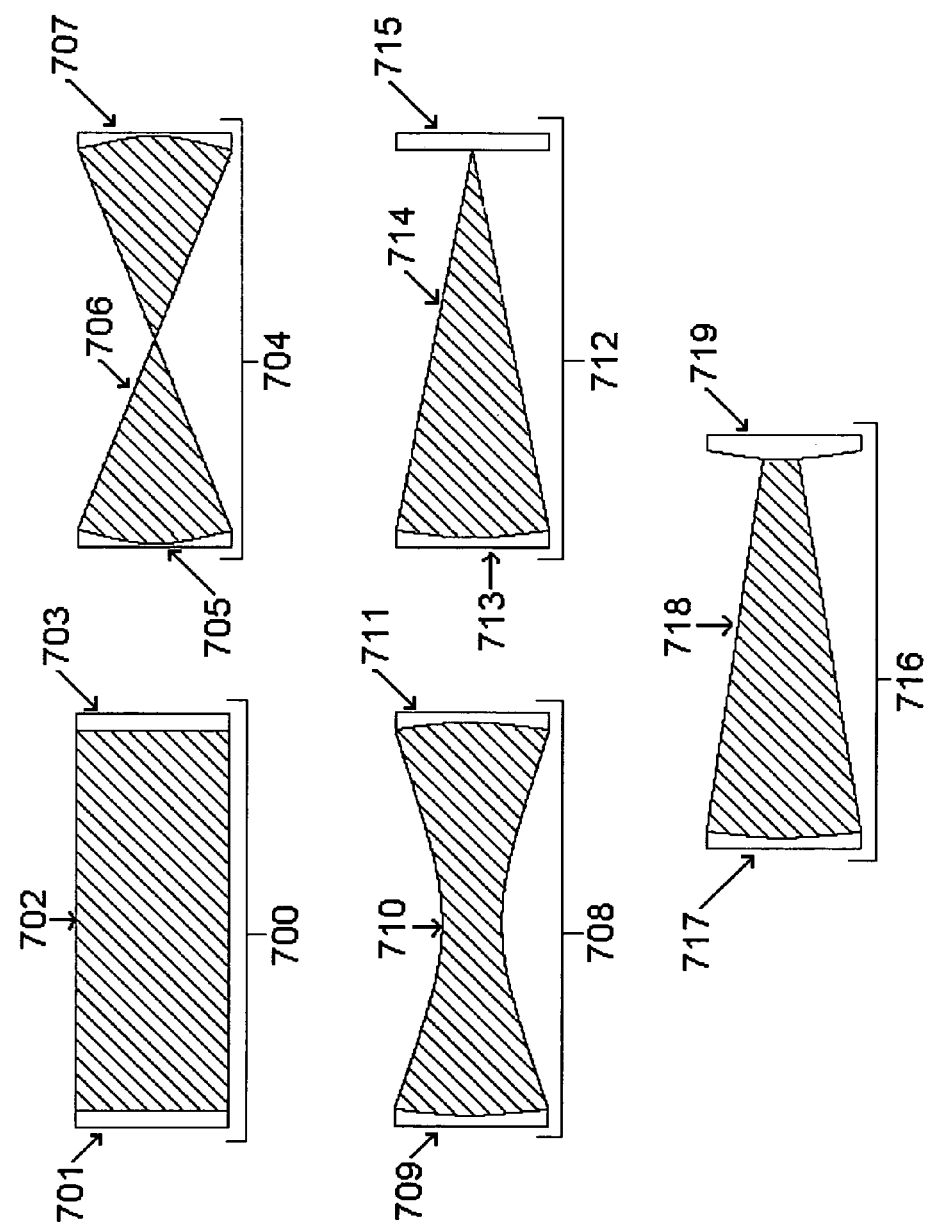
FIG. 7 is an illustration of different embodiments of intracavity mirrors.

In order to maximize laser thrust 405, first mirror 403 and second mirror 408 are positioned so that intracavity laser beam 404 ricochets between both mirrors multiple times in the present embodiment. First mirror 403 and second mirror 408 can be positioned and shaped in many different ways in order to induce a plurality of reflections of intracavity laser beam 404. Because the laser photons are virtually trapped in the intracavity beam 404, the average laser power in the intracavity will be amplified. Several optional embodiments of first mirror 403 and second mirror 408 are illustrated in FIG. 7 and will be discussed in detail below.

In an exemplary embodiment, first mirror 403 and second mirror 408 are coated with a high-reflector coating to bring a reflection coefficient of each mirror very close to 1. For example, if a reflectance of first mirror 403 and second mirror 408 is 0.999, the power of the intracavity laser beam 404 can be 1,000 times larger than that of the extracavity laser beam. The higher the reflection coefficient of first mirror 403 and second mirror 408, the more powerful laser thrust 405.

A percentage of intracavity laser beam 404 can transmit through a back of second mirror 408 to create an extracavity laser beam 409. The properties of intracavity laser beam 404 can be measured by measuring the properties of extracavity laser beam 409. In one embodiment, properties of extracavity laser beam 409 are measured through laser power meter 407. In an exemplary embodiment, extracavity laser beam 409 is focused through lens 406 towards a receiving input area of laser power meter 407. Typically, a user of a laser thruster system would want to extrapolate how much thrust is produced by intracavity laser beam 404 by measuring the power of extracavity laser beam 409.

Laser thrust 405 is roughly calculated using a number of factors. First, the thrust produced by a laser beam on each mirror is given by:

$$F_T = \frac{WRS}{c} \quad (1)$$

In the above equation (1), $F_T$ is the force of thrust in Newtons, W is the laser power in Watts, R is the reflectance in percent of photons reflected by the mirror, S is the total power enhancement factor, and c s the velocity of light, which is $3 \times 10^8$ m/s. The total power enhancement factor is the ratio of the intracavity laser power to the extracavity laser power. If there is no saturation of laser gain media 402, and there are no thermal management limitations, the ideal total power enhancement factor is given by:

$$S = \frac{T(1+R)}{(1-R)^2} \quad (2)$$

In the above equation (2), S is the ideal total power enhancement factor without saturation of the gain media and without thermal limitations, T is the transmittance through the mirror in percent of photons transmitted through the mirror, and R is the reflectance in percent of photons reflected by the mirror. The transmittance T is given by:

$$T = 1 - R - A \quad (3)$$

In the above equation (3), T is the transmittance of the mirror in percent of photons transmitted through the mirror, R is the reflectance in percent of photons reflected by the mirror, and A is the absorption of the mirror coating during reflection in percent of photons absorbed by the mirror. Hence, after combining equations (1), (2), and (3), the force of thrust on one mirror is given by:

$$F_T = \frac{WR(1-R-A)(1+R)}{c(1-R)^2} \quad (4)$$

For high quality mirrors where R~0.99999 and A~$10^{-6}$, T≈1−R and R(1+R)≈2, giving a simplified equation of:

$$F_T \approx \frac{2W}{(1-R)c} \quad (5)$$

Figures 14, 15:
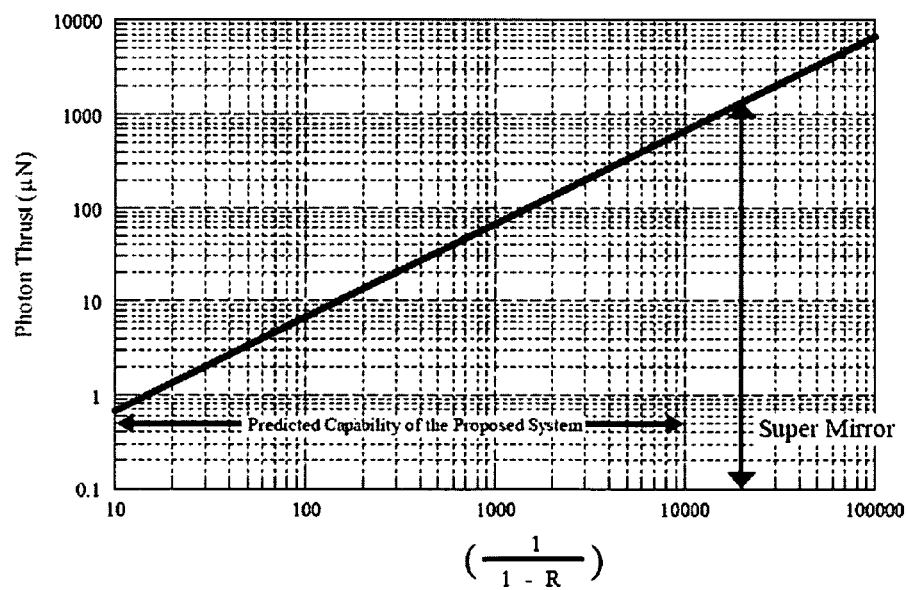
FIG. 14 is a table describing the maximum theoretical thrusts of a laser thruster in accordance with one embodiment as a function of mirror reflectance at an extracavity laser power of 10 W.
FIG. 15 is a line graph describing the maximum theoretical thrusts of a laser thruster in accordance with one embodiment as a function of number of reflections between two mirrors at an extracavity laser power of 10 W.

With current technology, the estimated theoretical thrust as a function of the reflectance of the mirrors is summarized in FIG. 14. These estimates do not take into account the power saturation of the gain media, the thermal management capacity of the gain media, nor the manufacturing consistency of the mirrors. An optimum design as disclosed is different from typical laser cavities that have been built in the past, as those are more tailored to maximize laser output power in the extracavity. However this graph still shows a good approximation of the potential power of intracavity laser beam 404.

Because of the limitations in laser gain mediums and other thermal effects, the total calculated thrusts summarized in FIG. 14 and FIG. 15 should be considered as theoretical upper bounds. In order to compensate, an exemplary embodiment of the invention would use super mirrors with a reflectance of 0.99995, which give a theoretical maximum thrust of 1.34 milli-Newtons when powered by a 10 W laser, which is well above a thrust necessary to compensate for normal perturbations in space environments.

Another depiction of the maximum theoretical thrust of an embodiment of a laser thruster is shown in FIG. 15. A higher number of reflections between two mirrors of the laser thruster will result in a higher laser thrust 405, as will a higher laser power.

Based on the currently available laser technology, by making the gain media thin enough, a laser thruster built using mirrors with a reflectance of 0.999-0.9999 is predicted to be readily possible with the laser design optimized for maximizing the intracavity power in the near future. With this, 10 W laser thrusters are predicted to deliver up to 670 μN, which is large enough to compensate various perturbations in the space environment for most of the missions shown in FIG. 1. We note that the achievement of such high laser thrusts will probably require highly sophisticated gain medium and pumping design and engineering, which is predicted to be within reach in the near future.

Laser thrusters have not been used in the past as the thrust at a given propulsion energy is much smaller than the thrust of conventional thrusters. The specific thrust formula is given by:

$$T_s = \frac{T}{P} \tag{6}$$

In the above equation (6), $T_S$ is the specific thrust, T is the thrust, and P is the propulsion power. For nonrelativistic cases, the following is true:

$$T = \delta m v \tag{7}$$

$$P = \frac{\delta m v^2}{2} \tag{8}$$

In the above equations (7) and (8), δm is the mass flow rate of propellant providing thrust, and v is the velocity of the object providing thrust. Hence, after combining equations (6), (7), and (8), specific thrust is given by:

$$T_s = \frac{2}{v} = \frac{2}{I_{sp}g} \tag{9}$$

In the above equation (9), $I_{sp}$ is the specific impulse, and g is the gravitational acceleration constant of 9.8 m/s². For the photon case the following is true:

$$T = \frac{P}{c} \tag{10}$$

Thus:

$$T_s = \frac{1}{c} \tag{11}$$

Figure 16:
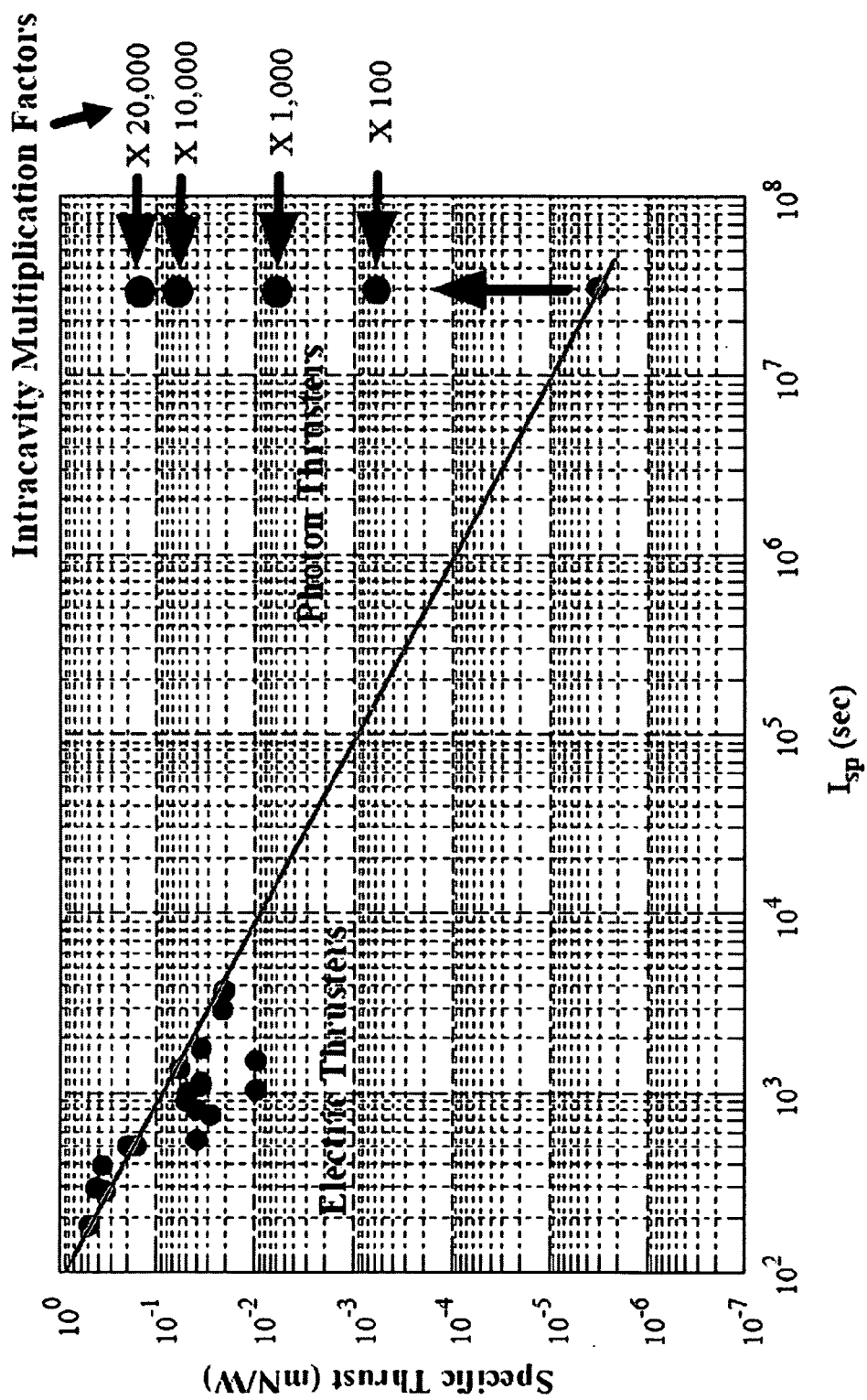
FIG. 16 is a line graph describing the specific thrust of a laser thruster in accordance with one embodiment as a function of exhaust particle velocity.

For both conventional thrusters and laser thrusters, the specific thrust is inversely proportional to the $I_{sp}$, or the exhaust particle velocity. Thus, the higher the $I_{sp}$, the less the specific thrust. FIG. 16 shows specific thrusts as functions of $I_{sp}$ for various conventional electric thrusters in the top left-hand corner and shows the specific thrust for a conventional laser in the bottom right-hand corner. As shown in the graph, the specific thrust for a normal laser is about four orders of magnitude weaker than the weakest electric thruster because of its high $I_{sp}$. Therefore, a regular laser is highly inefficient in generating thrust, and is impractical in most missions.

However, with the intracavity arrangement shown in FIG. 4, the momentum transfer, and thus the specific thrust, is multiplied by bouncing photons between first mirror 403 and second mirror 408. When photons are reflected greater than 10,000 times, the specific thrust of a laser thruster is comparable to the most efficient electrical thrusters. Additionally, a laser thruster system does not require rocket fuel, so the effectiveness of the thruster is not limited by fuel capacity, but rather by the lifetime of the thruster parts itself, which is primarily the lifetime of the pump source 400.

Currently, the lifetime of diode pumped solid state lasers at full operation power is limited by the pump diodes themselves, which is approximately 10,000 hours, or one full year of continuous operation. The lifetime of a laser thruster system can be extended by replacing pump source 400 with new ones. In one embodiment, pump source 400 is replaced via a carousel of pump sources which replaces pump source 400 as it wears down. The alignment of pump source 400 does not have to be precise, and so other methods of dynamically replacing pump source 400 can be utilized without departing from the scope of the present invention.

In order to ensure that as many photons as possible reflect off of mirror 403 and mirror 408, mirror 403 and mirror 408 should be large enough to accommodate the full radius of curvature. In one embodiment, the diameter of mirror 403 and the diameter of mirror 408 is slightly larger than what is needed. The theoretical limit of an intracavity length L for a confocal cavity resonator with two laser beams with radius $r_1$ and $r_2$, and a laser with wavelength λ, is given by:

$$L = \frac{r_1 r_2}{\lambda} \tag{12}$$

In order to properly reflect the whole of a laser beam with radius $r_1$, a circular mirror should have at least a radius equal to $r_1$. In an embodiment that reflects two laser beams with of radii $r_1$ and $r_2$, mirror 403 needs to have a radius larger than both $r_1$ and $r_2$. In one embodiment, where mirror 403 and mirror 408 are identical, the radius r of both mirrors is then given by:

$$r = (L\lambda)^{1/2} \tag{13}$$

Figure 17:
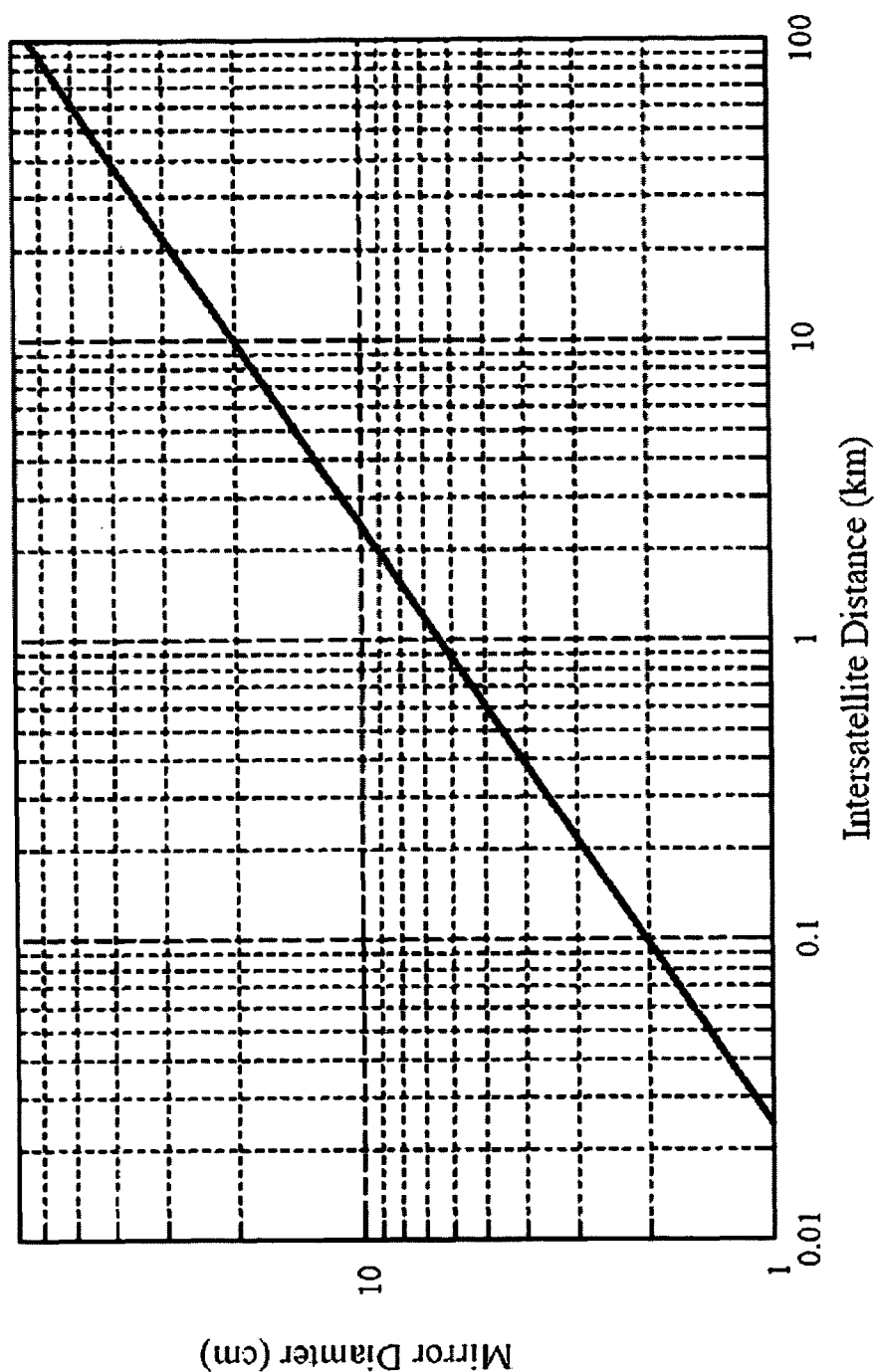
FIG. 17 is a line graph describing an ideal size of a mirror diameter in accordance with one embodiment as a function of ideal intersattelite distance.

In the above equation (13), L is then the ideal intracavity length between satellite 200 and satellite 201, as that position is where the maximum number of photons will be reflected between mirror 403 and mirror 408. A visual graph of the minimum diameter of mirrors in this embodiment is shown in FIG. 17. For example, for MAXIM applications, where L=200 m, and λ=1 μm, the minimum diameters of mirror 403 and mirror 408 in this embodiment would be about 3 cm. In another example, where operation distances of 1 km and 10 km are needed, the minimum diameters of mirror 403 and mirror 408 are 7 cm and 20 cm, respectively.

When both mirror 403 and mirror 408 form a confocal resonator with a radius of curvature equal to a maximum intersatellite operation distance, since the curvature and radius of mirror 403 and mirror 408 of the proposed formation process are designed for maximum effectiveness at distance L, at shorter distances, intracavity laser beam 404 will be defocused, and thrust will be much lower. In this embodiment, the characteristics of intracavity laser beam 404 will be in between that of a confocal cavity, and that of a flat mirror cavity. The fractional power loss per transit of intracavity laser beam is a function of the Fresnel number N, given by:

$$N = \frac{r_1 r_2}{\lambda L} \qquad (14)$$

In the above equation (14), L is the length of the laser cavity, $r_1$ $r_2$ are the radii of the laser beam projected on the mirrors, and λ is the wavelength of the laser beams. In this embodiment, $r_1$, $r_2$, and λ are constant, and thus N is inversely proportional to L. The fractional power loss per transit is a function of N. If mirror 403 and mirror 408 are shaped confocally, the fractional power loss is a rapidly exponentially decreasing function of N. If mirror 403 and mirror 408 are flat, the fractional power loss is a slowly exponentially decreasing function of N.

Typically, when deploying a PTFF, satellite 200 and satellite 201 are adjacent to one another, and the final matrix is achieved by firing a laser thruster until satellites 200 and 201 establish a desired initial intersatellite distance, typically equal to the radius of curvature of identical confocal mirrors 403 and 408. During this deployment phase, a tether would be gradually released. At very short operation distances, particularly during this initial deployment, the power of intracavity laser beam 404 is close to that formed by flat mirrors. The effects of N and the shift of curves on the fractional power loss per transit in the laser cavity are expected to compensate each other to a certain degree. If the compensation is not enough, an increase in diameter of mirrors 403 and 408 is recommended.

FIG. 5 is a close up view of one satellite in FIG. 4, showing the details of subsystems.

FIG. 5 depicts mirror 408, extracavity laser beam 409, lens 406, laser power meter 407, alignment modifier 500, reflectance mirror 502, interferometric laser beam 501, photodetector laser beam 503, and interferometric lens 504. In this embodiment, four laser power meters 407 are deployed for redundancy purposes. Lens 406 focuses a percentage of extracavity laser beam 409 towards an input aperture on laser power meter 407. As shown, different parts of extracavity laser beam can be utilized for different purposes. Photodetector laser beam 503 can be utilized to glean properties of extracavity laser beam 409, such as power. Interferometric laser beam can be redirected using reflectance mirror 502 towards an interferometric system to help calculate distance between satellite 200 and satellite 201 with ultrahigh precision.

FIG. 6 is a close up perspective view of the mirror of FIG. 5.

FIG. 6 depicts mirror 408, alignment modifier 500, and lens 406. Jittering of satellite 200 and satellite 201 may result in misalignment of mirror 403 and mirror 408 from their optimal angles. FIG. 6 shows one method of attaching alignment modifier 500 so that their placement does not interfere with lens 406. In one embodiment, mirror 403 and mirror 408 are actively aligned using piezoelectric crystals attached to mirror 408 and mirror 403. When a small amount of electricity is applied to alignment modifier 500, the alignment of mirror 408 tips slightly upward. Other angles can be achieved by applying different amounts of electricity to other piezoelectric crystals attached to mirror 408. Alignment modifier 500 may use other materials to change the alignment of mirror 408 without departing from the scope of the invention.

Control of alignment modifier 500 may be responsive to active feedback signals given by photodetector laser beam 503. In some situations, where satellite 200 and satellite 201 are located at extreme distances from one another, for example micrometeroid impact, reestablishment of the confocal laser cavity may necessitate more drastic alignment changes than alignment modifier 500 can provide. In this situation, other methods may be used to establish initial laser beam alignment, for example rocking or scanning mirror alignment with coarse alignment modifiers. Once the rough method partially aligns intracavity laser beam 404, alignment modifier 500 can be utilized to fine tune or maximize laser power and quality.

In an exemplary embodiment, photodetectors (not shown) can be placed around a perimeter of first mirror 403 or second mirror 408, or both mirrors 403 and 408. Should the alignment of either mirror deviate, the photodetectors installed will detect the deviation, and adjust the angle of either mirror accordingly, using alignment modifier 500 or some other alignment modifier.

In a conventional formation flying system, each spacecraft equips both lateral and longitudinal control systems, including thrusters and metrology system. The use of crystalline structure with thrusters and tethers with formation flying simplifies the formation control and only longitudinal control and metrology systems are necessary. Furthermore, since a laser thruster system uses lasers as a propulsion mechanism, these lasers can also be used in a metrology system, combining both the propulsion system and the metrology system together.

When satellite 200 and satellite 201 are located an ideal distance away from each other with a confocal resonator with self-aligning properties due to laser thrust, the system has a high stability laser system in place, which is ideal for ultrahigh precision interferometric ranging systems. As both the thruster and the interferometer are combined into one system, system weight and power consumption is considerably reduced.

In an exemplary embodiment, the interferometric ranging system is a laser interferometric ranging system, which harnesses extracavity laser beam 502 shown in FIG. 5.

FIG. 7 is an illustration of different embodiments of intracavity mirrors.

FIG. 7 depicts flat mirror embodiment 700, flat mirror 701, intracavity laser beam 702, flat mirror 702, concentric mirror embodiment 704, concentric mirror 705, intracavity laser beam 706, concentric mirror 707, confocal mirror embodiment 708, confocal mirror 709, intracavity laser beam 710, confocal mirror 711, hemispherical mirror embodiment 712, hemispherical mirror 713, intracavity laser beam 714, flat mirror 715, concave-convex mirror embodiment 716, concave mirror 717, intracavity laser beam 718, and concave mirror 719.

In flat mirror embodiment 700, flat mirror 701 and flat mirror 703 are both completely flat, reflecting intracavity 702 in a straight line. This embodiment has an advantage of reflecting a maximum amount of intracavity laser beam 702 at any distance. A slight angle deviation, however, could reflect intracavity laser beam 702 towards an undesired target, severely limiting the number of reflections of intracavity laser beam 702, and hence thrust power. Typically, flat mirror 701 and flat mirror 703 should face each other with an accuracy of one arcsecond.

In concentric mirror embodiment 704, concentric mirror 705 and concentric mirror 707 are curved to reflect intracavity laser beam 706 at an angle such that a portion of intracavity laser beam 706 that hits a section of concentric mirror 705 will be reflected towards an opposite section of concentric mirror 707. For example, a laser beam that reflects off of the very top of concentric mirror 705 would reflect to towards the very bottom of concentric mirror 707. Typically, concentric mirror 705 and concentric mirror 707 are spherically curved, with a radius of curvature equal to twice an ideal distance between concentric mirror 705 and concentric mirror 707, but concentric mirror 705 and concentric mirror 707 can be shaped and focused parabolically without deviating from the scope of the present invention. A mirror that is focused as a paraboloid instead of a perfect sphere can focus intracavity laser beam 706 at a sharper focal point than spherical mirrors, which may have a spherical aberration defect.

Concentric mirror embodiment 704 also has the benefit of a self-aligning property, as the ricocheting photons will tend to push first concentric mirror 403 and second concentric mirror 408 into a position where both mirrors exactly face each other. Additionally, a first concentric mirror 403 and second concentric mirror 408 shaped to form a confocal resonator will have much less diffraction loss than if they were shaped as flat mirrors.

In confocal mirror embodiment 708, confocal mirror 709 and confocal mirror 711 are curved to reflect intracavity laser beam 710 at an angle such that a portion of intracavity laser beam 710 that hits a section of confocal mirror 709 will be reflected towards a center of confocal mirror 711, and vice-versa. Typically, confocal mirror 709 and confocal mirror 711 are spherically curved, with a radius of curvature equal an ideal distance between confocal mirror 709 and confocal mirror 711, but confocal mirror 709 and concentric mirror 711 can be shaped and focused parabolically without deviating from the scope of the present invention. A mirror that is focused as a paraboloid instead of a perfect sphere can focus intracavity laser beam 710 at a sharper focal point than spherical mirrors, which may have a spherical aberration defect.

Similar to concentric mirror embodiment 704, confocal resonator embodiment 708 also has the benefit of a self-aligning property. Confocal mirror 709 and confocal mirror 711 are typically only required to face each other with an accuracy of a quarter of a degree—two orders of magnitude less stringent than with flat mirror embodiment 700. Confocal resonator embodiment 708 also has even less diffraction than concentric mirror embodiment 704.

For both concentric resonator embodiment 704 and confocal resonator embodiment 708, distance between the mirrors involved is a factor. A concentric resonator embodiment 704 takes maximal effect when the distance between concentric mirror 705 and concentric mirror 707 is equal to twice the radius of curvature when curved spherically, or twice the focal length when curved parabolically. Likewise, a confocal resonator embodiment 708 takes maximal effect when the distance between confocal mirror 709 and confocal mirror 711 is equal to the radius of curvature when curved spherically, or the focal length when curved parabolically. Typically, two satellites will need to maintain a specific ideal distance away from one another during full deployment, and so the mirrors forming an intracavity laser beam should be shaped to deliver maximum thrust at that ideal distance.

At shorter distances than the ideal distance, however, the power of intracavity laser beam 706 or intracavity laser beam 710 may be weakened, and the mirrors may act more like flat mirrors. In another embodiment, satellite 200 and satellite 201 may have a plurality of matching mirrors which can be used at different distances to maximize a laser thrust at certain key distances. In an exemplary embodiment, the mirrors are made of concentric circles, where each circle has a different radius of curvature (or may even be flat), optimized for different distances between satellite 200 and satellite 201.

Intracavity mirrors need not be identically curved. In hemispherical mirror embodiment 712, hemispherical mirror 713 is curved either confocally or parabolically to focus intracavity laser beam 714 a certain ideal distance. Since hemispherical mirror 713 can focus intracavity laser beam 714 to a point, flat mirror 715 can be much smaller than hemispherical mirror 713. A smaller mirror can be useful for a satellite with stringent weight requirements, or a hub satellite which must reflect a plurality of intracavity laser beams. Additionally, if flat mirror 715 is smaller, a laser beam positioned behind flat mirror 715 may be aimed directly at hemispherical mirror 713 wherein only a small percentage of the laser beam travels through flat mirror 715, which decreases possible absorption by the back of flat mirror 715.

In concave-convex mirror embodiment 716, concave mirror 717 is curved confocally or parabolically to focus intracavity laser beam 718 towards a convex mirror 719 up to a certain ideal distance. Much like flat mirror 715, convex mirror 719 can also be much smaller than the opposing mirror, in this example concave mirror 717. Concave-convex mirror embodiment 716 has the benefit of a self-aligning property, in addition to having the benefit of a smaller mirror, which can be useful for a satellite with stringent weight requirements, or a hub satellite which must reflect a plurality of intracavity laser beams. Other embodiments of intracavity lasers can be used without departing from the scope of the present invention.

Figure 8:
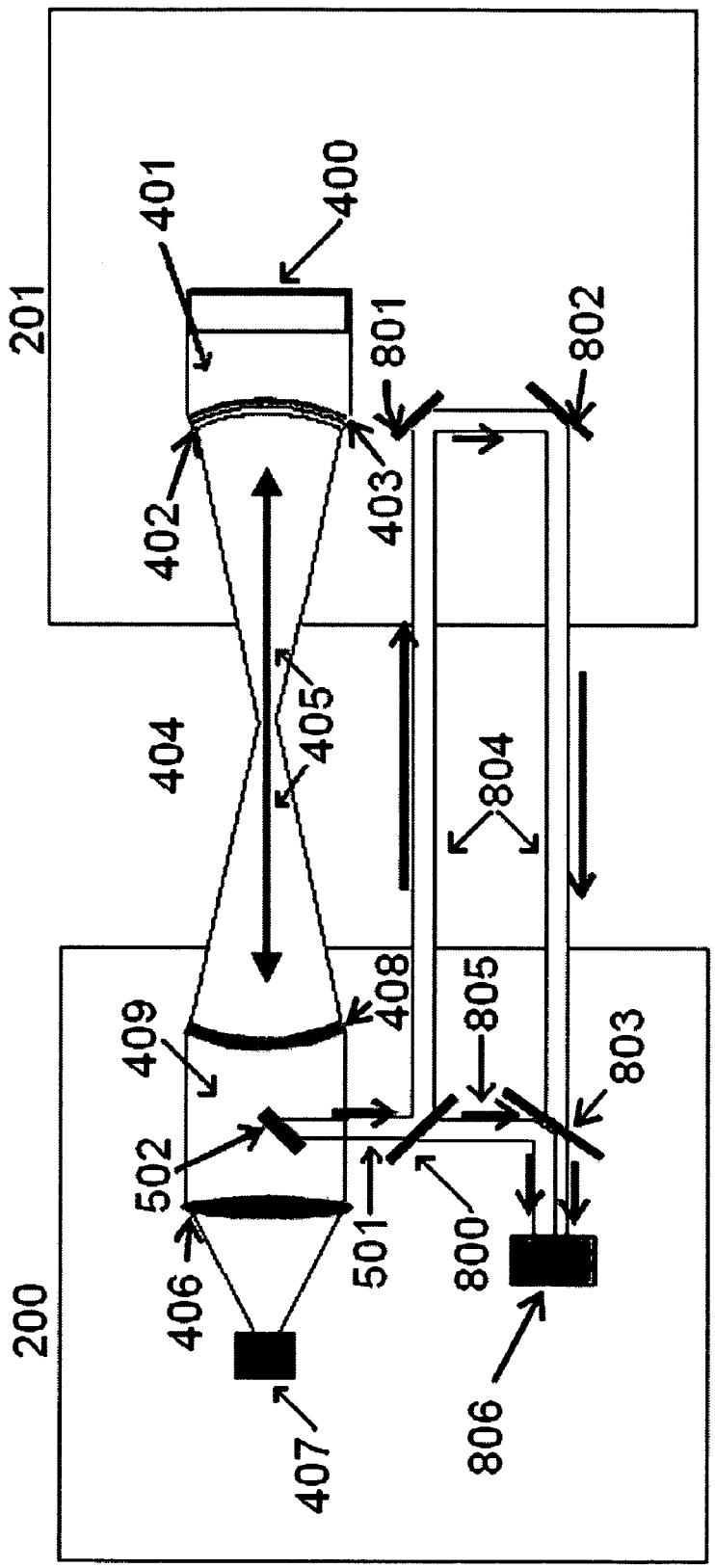
FIG. 8 is a schematic diagram of a laser thrust system coupled with a laser interferometric ranging system in accordance with one embodiment.

FIG. 8 is a schematic diagram of a laser thrust system coupled with a laser interferometric ranging system in accordance with one embodiment.

FIG. 8 illustrates a Michelson interferometric scheme coupled with a laser thrust system depicting a first satellite 200, a second satellite 201, a pump source 400, a pump laser beam 401, a laser gain media 402, first mirror 403, second mirror 408, an intracavity laser beam 404, a laser thrust 405, a lens 406, a laser power meter 407, an extracavity laser beam 409, reflectance mirror 502, first partial mirror 800, second partial mirror 803, first high reflectance mirror 801, second high reflectance mirror 802, interferometric laser beam 501, first percentage of interferometric laser beam 804, second percentage of interferometric laser beam 805, and photodetector 806.

Typically, the power of interferometric laser beam 501 will be stable as satellite 200 and satellite 201 maintain an ideal distance, and perturbations are minimized by countered forces of tethers and laser thrust. However, even if the power of interferometric laser beam 501 fluctuates, a Michelson interferometric laser scheme can be designed to be insensitive to overall laser power fluctuations, as they rely on counting the interferometric fringes rather than measuring absolute power.

Reflectance mirror 502 can be either a partial mirror, or a high reflectance mirror. Referring to FIG. 5, part of extracavity laser beam 409 could be reflected by reflectance mirror 502 to form interferometric laser beam 501, and then focused through interferometric lens 504, which decreases a laser beam diameter of interferometric laser beam 501 and adjusts its focal property. Interferometric laser beam 501 is then further reflected by first partial mirror 800, and first percentage of interferometric laser beam 804 is directed to first high reflectance mirror 801 on satellite 201. The first percentage of interferometric laser beam 804 is then reflected by second high reflectance mirror 802 towards second partial mirror 803 on satellite 200. As reflected first percentage of interferometric laser beam 804, passes through partial mirror 803, it combines with second percentage of interfermometric laser beam 805, and enters photodetector 806. From the interference pattern formed on either second partial mirror 803, or photodetector 806, the distance between satellites 200 and satellites 201 is determined. This distance information can be used to control both the laser thrust system, and the tether system.

First high reflectance mirror 801 and second high reflectance mirror 802 are shown as two separate mirrors, but can be combined into a single retroreflector, for example a right angle prism, without departing from the scope of the present invention. In one embodiment, an additional lens (not shown) is used to focus the combined laser beam towards an input aperture (not shown) on photodetector 806.

Figure 9:
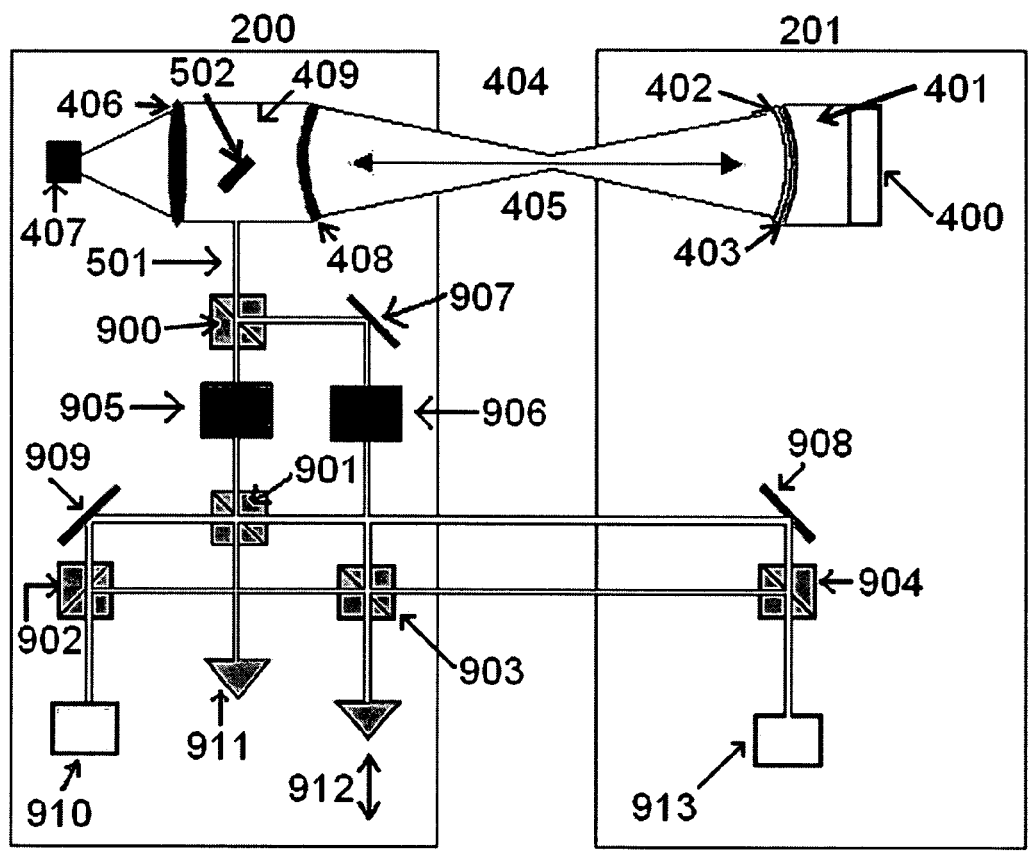
FIG. 9 is a schematic diagram of a laser thrust system coupled with an improved heterodyne laser interferometric ranging system in accordance with one embodiment.

FIG. 9 is a schematic diagram of a laser thrust system coupled with an improved heterodyne laser interferometric ranging system in accordance with one embodiment.

FIG. 9 illustrates a Heterodyne interferometric scheme coupled with a laser thrust system depicting a first satellite 200, a second satellite 201, a pump source 400, a pump laser beam 401, a laser gain media 402, first mirror 403, second mirror 408, an intracavity laser beam 404, a laser thrust 405, a lens 406, a laser power meter 407, an extracavity laser beam 409, reflectance mirror 502, interferometric laser beam 501, first beam splitter 900, second beam splitter 901, third beam splitter 902, fourth beam splitter 903, fourth beam splitter 904, first AOM 905, second AOM 906, first high reflectance mirror 907, second high reflectance mirror 908, third high reflectance mirror 909, measurement detector 910, retroreflector 911, optical delay line 912, and reference detector 913.

Heterodyne interferometry is based on the production of two coherent beams, a reference beam measured by reference detector 913, and a measurement beam measured by measurement detector 910. Each beam needs to have slightly different frequencies, which is a situation that can be created using two lasers, or one laser with an acousto-optical modulator (AOM), or two lasers with two AOMs. The embodiment illustrated in FIG. 9 shows a design with two AOMs, first AOM 905, and second AOM 906.

In the illustrated embodiment, the first part of interferometric laser beam 501 is sent to reference detector 913. The second part of interferometric laser beam 501 is sent to reference retroreflector 911, and is sent back to measurement detector 910. The second part of this measurement beam is sent to optical delay line 912, which is then sent back to measurement detector 910. The phase difference between the signal of measurement detector 910 and reference detector 913 is directly proportional to the path difference between satellite 200 and satellite 201. In one embodiment, this phase difference is translated from an optical frequency region into an electrical impulse, which is then measured to return a distance within a nanometer accuracy.

It is to be understood that many other interferometers can be used without departing from the scope of the present invention, and will most likely depend on the specific mission requirements.

Figure 10:
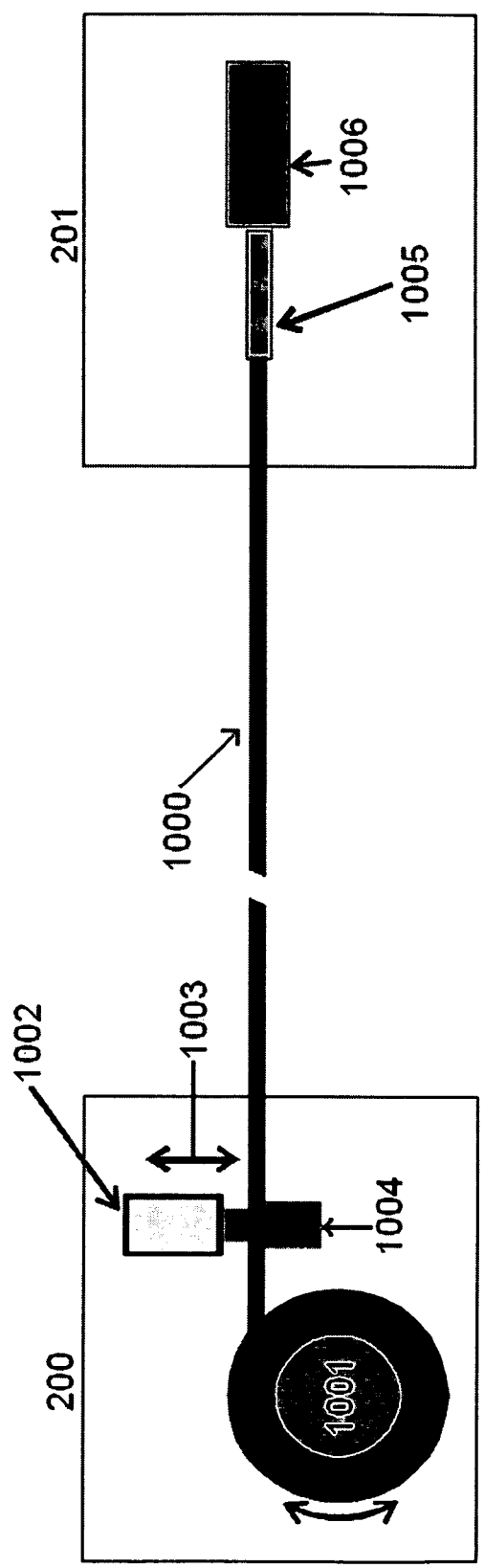
FIG. 10 is a schematic diagram of a tether system in accordance with one embodiment.

FIG. 10 is a schematic diagram of a tether system in accordance with one embodiment.

FIG. 10 discloses satellite 200, satellite 201, a tether cord 1000, a tether reel 1001, an electromechanical damper 1002, a damper force 1003, a clamp 1004, a piezoelectric translator 1005, and an inchworm 1006. In order to maintain the matrix structure of the PTFF, the proposed laser thrust system should be paired with a tether system to provide an attracting force between satellite 200 and satellite 201. In one embodiment, satellite 200 has tether reel 901, and a dampening system made up of electromechanical damper 1002, and clamp 1004, while satellite 201 has piezoelectric translator 1005, and inchworm 1006.

Tether reel 1000 will be able to unwind or rewind tether cord 1000, adjusting the distance between satellite 200 and satellite 201. Once tether cord 1000 has been stretched to an ideal distance, clamp 1004 can be set in order to prevent tether cord 1000 from unwinding any more. Fine-tuning of the length of tether cord 1000 can be performed via inchworm 1006, and piezoelectric translator 1005. Optionally, inchworm 1006 may be replaced by a stepper motor or similar device without departing the scope of the present invention.

Figure 11:
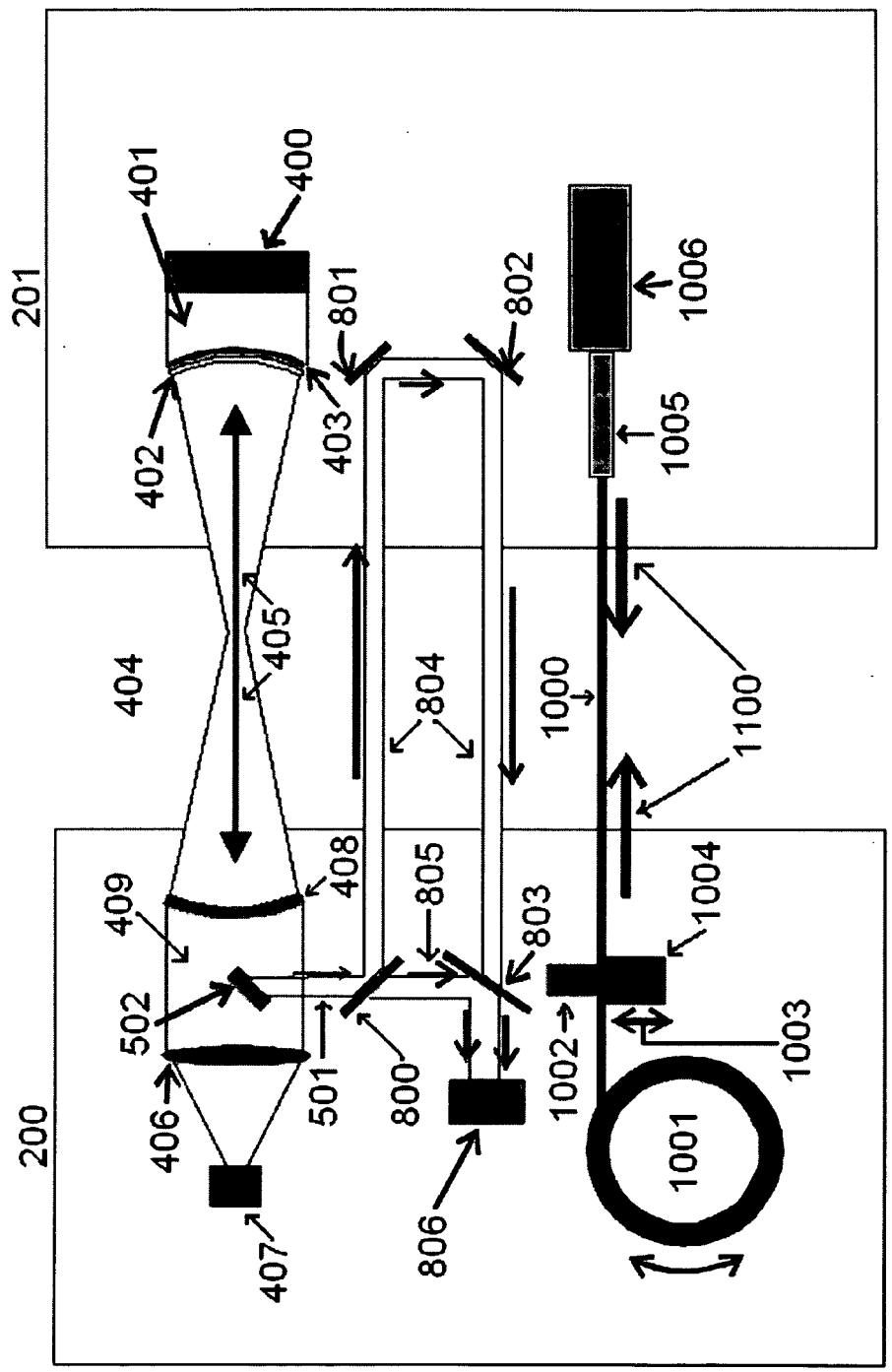
FIG. 11 is a schematic diagram of a combined system of a laser thrust system, an interferometric ranging system, and a tether system in accordance with one embodiment.

FIG. 11 is a schematic diagram of a combined system of a laser thrust system, a Michelson interferometric ranging system, and a tether system in accordance with one embodiment. The Michelson interferometric ranging system can be replaced with heterodyne interferometric ranging system disclosed in FIG. 9 without departing from the scope of the present invention.

FIG. 11 discloses a first satellite 200, a second satellite 201, a pump source 400, a pump laser beam 401, a laser gain media 402, first mirror 403, second mirror 408, an intracavity laser beam 404, a laser thrust 405, a lens 406, a laser power meter 407, an extracavity laser beam 409, reflectance mirror 502, first partial mirror 800, second partial mirror 803, first high reflectance mirror 801, second high reflectance mirror 802, interferometric laser beam 501, first percentage of interferometric laser beam 804, second percentage of interferometric laser beam 805, and photodetector 806, a tether cord 1000, a tether reel 1001, an damper 1002, a damper force 1003, a clamp 1004, a piezoelectric translator 1005, an inchworm 1006, and a tether tension 1100. The tether elements of satellite 200 can be switched with the satellite elements of 201 without departing from the scope of the present invention.

Tether cord 1000 will be extended with laser thrust 405. While tether cord 1000 is being extended, the distance between satellite 200 and satellite 201 can be measured through an interferometer system. When an ideal distance is almost reached, clamp 1004 or tether reel 1000 can slow the extension of tether cord 1000. Once the ideal distance is reached, clamp 1004 can prevent tether cord 1000 from extending any more, and tether tension 1100 and laser thrust 405 will keep tether cord 1000 taught. Tether reel 901 can comprise an actuator which will extend the length of tether cord 1000 by small segments while satellites 200 and 201 are being pushed apart by laser thrust 405.

Fine-tuning of the length of tether cord 1000 can be performed by inchworm 1006 and attached piezoelectric translator 1005. Current off the self commercial piezoelectric translators can deliver accuracy resolution of 0.02 nanometers. Since the accuracy in distance maintenance relies on the accuracy of piezoelectric translator 1005, the tether system shown in FIG. 10 and FIG. 11 delivers sub nanometer accuracy, and will be able to deliver even higher accuracy as technology improves, for example piezoelectric technology. In another embodiment of the invention, a stepper motor is attached to piezoelectric translator 1005 instead of inchworm 1006. Vibration perturbation or resonance can be rapidly damped by laser thrust 405 in combination with tether tension 1100.

The attracting force of tether cord 1000 should be closely regulated so as to prevent too much strain on tether cord 1000. To find the tension on tether cord 1000, we first look at the variation in length of the tether, $\Delta l_F$, which is given by:

$$\Delta l_F = \frac{F_T l}{YA} \tag{15}$$

In the above equation (15), $F_T$ is the force of tension on tether cord 1000, l is the length of tether cord 1000, Y is Young's modulus, and A is the cross sectional area of tether cord 1000. This can be rewritten as a Hooke's law equation:

$$F_T = k\Delta l_F \tag{16}$$

$$\text{where } k = \frac{YA}{l}$$

If tether cord 1000 is stretched by a repelling laser thrust force given by $F_L$, the total force, F, applied on tether cord 1000 is given by:

$$F = k\Delta l_F + F_P - F_L \tag{17}$$

for $\Delta l_F > 0$, and $$F = F_P - F_L \tag{18}$$

for $\Delta l_F < 0$

In the above equations (17) and (18), $F_P$ is the equilibrium force on satellite 200 and satellite 201 from environmental perturbation, for example gravitational gradients and solar pressure.

The length of tether cord 1000, and consequently the distance between satellite 200 and satellite 201, can be fine-tuned by adjusting the laser power of pump source 400. For example, in a system that has a 1 km ideal distance, with a Kevlar tether with a radius of 2 mm, in order to achieve 1 nm accuracy, laser thruster accuracy should be 1.2 µN. For example, for L2 orbit applications, $F_P$ is estimated to be less than 50 µN, and the average $F_L$ will be maintained near 100 µN, and thus the required thruster accuracy is 1.2%. This is well within the reach of off-the-shelf laser power accuracy today.

An alternative way to maintain distance accuracy between satellite 200 and satellite 201 is to maintain laser thrust 405, and alter tether tension via piezoelectric translator 1005. Since piezoelectric translators have resolution much better than 1 nm, the limiting function the accuracy of laser thrust 405 in maintaining a consistent thrust while piezoelectric translator 1005 adjusts the length of tether cord 1000. To keep laser thrust 405 constant, the noise to power ratio of intracavity laser beam 404 should be $10^{-2}$. As currently available constant wave laser systems contain a noise to power ratio of $10^{-5}$, the length of tether cord 1000 should be controllable within a nanometer.

In one embodiment, a structure would be deployed by grouping satellites together in a small matrix, and then inflating it, maintaining the matrix structure, using laser thrusters and tethers. Because photon velocity runs at the speed of light, control feedback of laser thrust 405 is almost instantaneous. Likewise, since laser interferometers based on interferometric laser beam 501 is also based on light, calculation of the distance between satellite 200 and satellite 201 is also almost instantaneous.

If laser thrust 405 is very low, tether cord 900 may have a non-linear and non-ideal behavior. Laser thrust 405 may be low during times of deployment, when mirror 403 and mirror 408 are at a non-ideal range. In one embodiment, satellite 200 and satellite 201 cause a tension spike that is long enough to straighten most of tether cord 1000, for example through a different thruster mounted on one of the satellites. In another embodiment, as tether cord 1000 unwinds from tether reel 1001, tether cord 1000 passes through a straightening roller (not shown) to minimize memory curvature.

As tether 1000 is exposed to sunlight or shade, tether 1000 may expand or contract due to temperature shift. Since thermal contraction or expansion is a very slow process, for example taking hours or even days, piezoelectric translator 1005 can adjust the length of tether 1000 in real-time to prevent a drastic shift in position of satellite 200 and satellite 201. In one embodiment, if a change in temperature results in a tether length change greater than the dynamic range of piezoelectric translator 1005, tether reel 1001 or inchworm 1006 can change the length of tether 1000 over a much larger dynamic range.

Tether cord 1000 may suffer some perturbation due to unforeseen circumstances, for example breaking filaments, micrometeroroid impacts, or reorientation of satellite 200 and satellite 201. Major types of tether vibration include longitudinal and transverse vibrations. In one embodiment, longitudinal vibrations are damped by tether material friction. In an exemplary embodiment, longitudinal vibrations are damped by modulating the power of pump source 400. Transverse vibrations can be damped out by vibration dampers on satellite 200 and satellite 201. Vibration dampers increase effectiveness the closer they are located to attachment points of tether cord 1000 to satellite 200 and satellite 201.

In one embodiment, damper 1002 exerts damping force 1003, holding tether cord 1000 taught against clamp 1004. Clamp 1004 acts as an impedance coupling mass, and transverse vibrations are absorbed through damper 1002. In one embodiment, damper 1002 is an electromechanical shock-absorber-like damper. In this dampening system, linear motion stiffness and damping can be adjusted by changing electrical parameters over a wide range. The transfer of energy carried by transverse vibration waves is maximized when tether wave impedance matches damper impedance. Impedance of transfer waves $Z_1$ is given by:

$$Z_1 = T\mu^{1/2} \tag{19}$$

In the above equation (19), T is the tether tension, and µ is the tether linear density. Impedance of a damper $Z_2$ is given by:

$$Z_2 = d + i\left(mw - \frac{k}{w}\right) \tag{20}$$

In the above equation (20), m is the mass of damper 1002, d is the damping coefficient, k is the spring constant, and w is the wave angular frequency. By equating Z1 and Z2, one obtains the results d=µv and $w = w_0 = (k/m)^{1/2}$.

The wave transmissibility function has the same formulation of energy loss per ping cycle of waves propagating along a tether terminated with a spring and dashpot massive damper.

If damper 1002 is turned to the first modal frequency of the transverse waves, the first mode is damped in one damping cycle. However, higher frequency modes can take more than one cycle to damp out, but a damper with light mass can damp higher-order modes over a few damping cycles.

In one embodiment, tether cord 1000 is made from a material with high environmental resistance, for example nylon, polyethylene, quartz, Kevlar, Vectran, carbon nanotubes, tungsten, and carbon fiber. In an exemplary embodiment, tether cord 1000 is a Spectra™ tether, or a Dyneema™ tether. In another embodiment, tether cord 1000 is made from hollow tubular braids, or flat braids. In an exemplary embodiment, a braided tether cord 1000 would have several complete twists from end to end, which can, among other things, null out variations in solar pressure forces on tether cord 1000. In another exemplary embodiment, braided tether cord 1000 has a very tight braid, which can, among other things, increase the hysteresis of tether cord 1000. In another embodiment, part of tether cord 1000 is coated with a lubricant to ease slippage. In still another embodiment, part of tether cord 1000 is coated with a matrix to prevent slippage. In an exemplary environment, tether cord 1000 is coated with Braycote™. In another embodiment, tether cord 1000 is created out of a monolithic thin flat strip of oriented polyethylene film. In another embodiment, tether cord 1000 is an electrodynamic tether which generates electric potential which can be harnessed for use.

In addition to powering laser thrust 405 to maintain the relative distance between satellite 200 and satellite 201, pump laser beam 401 can be used to reposition the absolute distance of satellite 200 and satellite 201. A mirror can be used to refocus the direction of pump laser beam 401, or the pump source 400 can be rotated in a thrusting direction. In one embodiment, the same laser is used to rotate the position of satellite 200 and satellite 201, via a mirror mounted on satellite 200 that can redirect a laser beam from satellite 201. In one embodiment, a laser on satellite 200 is used to rotate the position of satellite 200, and another laser on satellite 201 is used to rotate the position of satellite 201. In another embodiment, two lasers on satellite 200 and satellite 201 can be rotated to another thrusting position, to move the absolute position of the entire satellite matrix. In one embodiment, replacement laser diodes, for example plural pump laser diodes, can be used for slewing purpose without departing from the scope of the present invention.

If only satellite 201 was rotating its absolute position, for example, if satellite 200 and satellite 201, each with a weight of 100 kg, were 1 km away from one another, and satellite 201 has 3 laser thrust systems, each comprising a 100 W pump diode laser which requires 200 W of power, the combined thrust of all 3 laser thrusters is 1 µN, with an acceleration of $10^{-8}$ m/s². If satellite 201 accelerates to reach a halfway point between the starting position and the goal position, the time required for such slewing is given by:

$$t = 2\sqrt{\frac{2L}{a}} \quad (21)$$

In the above equation (21), t is the time required for slewing, L is the distance satellite 201 would need to travel, and a is the acceleration. For example, for 1 degree slewing over 1 km, L=17.5 m, with an acceleration of $10^{-8}$ m/s², t=1.18×10⁵ sec, or 1.37 days. For 10 degree slewing, t=4.33 days. If faster slewing is required, higher power lasers or conventional thrusters can be used without departing the scope of the present invention.

Although slewing may be slower than conventional thruster systems, the alignment accuracy with laser thrusters is very high. A diode laser pump beam can be turned off and on typically within one second, and if more precision is required, a mechanical chopper can be utilized to achieve a precise operation time. With a laser thrust system that achieves an acceleration of $10^{-8}$ m/s² that can be activated within the accuracy of 1 sec, the slewing angle accuracy would be $2 \times 10^{-11}$ rad, or 4 micro-arcseconds. If a chopper is used, a laser thrust can be chopped to have 10 msec operation, in which case the angle accuracy would be 0.4 nano-arcseconds. The scanning accuracy is limited by the 1 nanometer baseline accuracy, and is in the order of 0.1 micro-arcsec for a 1 km baseline system.

In low-earth orbits, the atmospheric drag may be too great for simple laser thrusters to counter, in which case the overall drag may be occasionally corrected by conventional thrusters or microthrusters.

In addition to redefining and simplifying existing commercial and defense applications, and NASA mission concepts, for example SPECS and MAXIM, PTFF design also enables other emerging revolutionary commercial and defense applications, and NASA mission concepts, such as Ultralarge Adaptive Membrane Telescopes, and Fourier Transform X-Ray Spectrometers.

Figure 12:
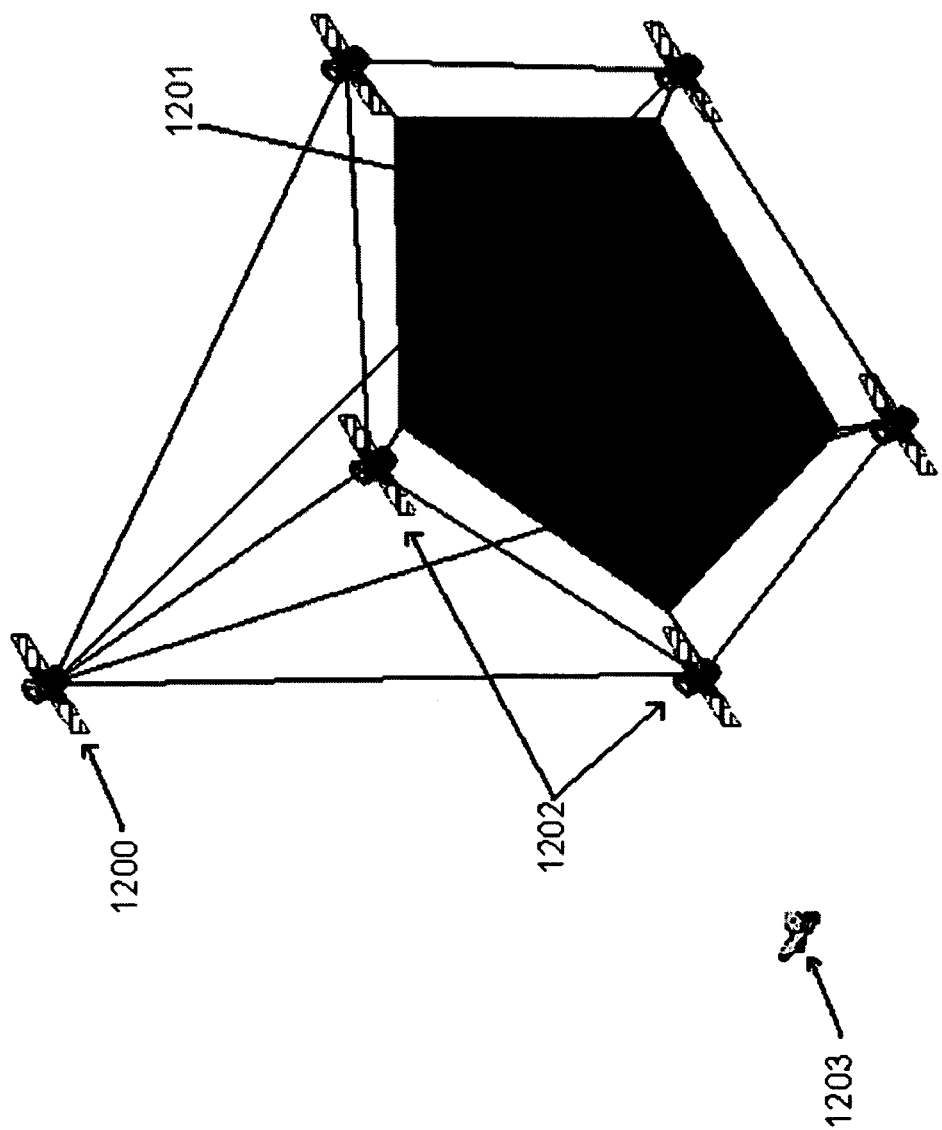
FIG. 12 is an illustration of an adaptive membrane telescope formed by a pentagonal pyramidial formation in accordance with one embodiment.

FIG. 12 is an illustration of an adaptive membrane telescope formed by a pentagonal pyramidial formation in accordance with one embodiment.

FIG. 12 discloses an image processor 1200, membrane mirror 1201, perimeter satellites 1202, and a James Webb Space Telescope space telescope 1203 for size comparison. A large membrane telescope can be constructed out of a series of 6 satellites, as shown in FIG. 12. In the present embodiment, membrane mirror 1201 is held in place by a series of perimeter satellites, which are held in position by laser thrusters and tethers. Perimeter satellites 1202 form the pentagon formation structure, and can create tension in the surface of membrane mirror 1201. Membrane mirror 1201 could comprise a reflective layer just thick enough to reflect a specific wavelength. In one embodiment, perimeter satellites 1202 actively change the curvature of membrane mirror 1201 for a wide range of optical resolutions by altering electrostatic potential applied across membrane mirror 1201. In another embodiment, a PTFF secondary mirror or membrane is flown as part of the system. Since the useful area of membrane mirror 1201 is 80% of the total membrane area, the need for continuous attachment isn't necessary.

Perimeter satellites 1202 are positioned in a strict perimeter relative to each other, and the matrix structure is maintained via laser thrust, tethers, and an interferometry system. Perimeter satellites 1202 provide enough stiffness to be the reaction structure for the application of membrane tension. Perimeter satellites 1202 also connect membrane 1201 to the rest of the matrix telescope structure. Image processor 1200 can be used to view and capture images focused by membrane mirror 1201.

Normal space telescopes, for example space telescope 1203, are currently much smaller than a membrane telescope using PTFF technology, and hence will not have as effective a resolution. An ultralarge PTFF membrane telescope as depicted in FIG. 12 can also be pointed at other planets, asteroids, and comets to study surfaces of those planets, asteroids, and comets at much higher resolutions than we can see today.

Figure 13:
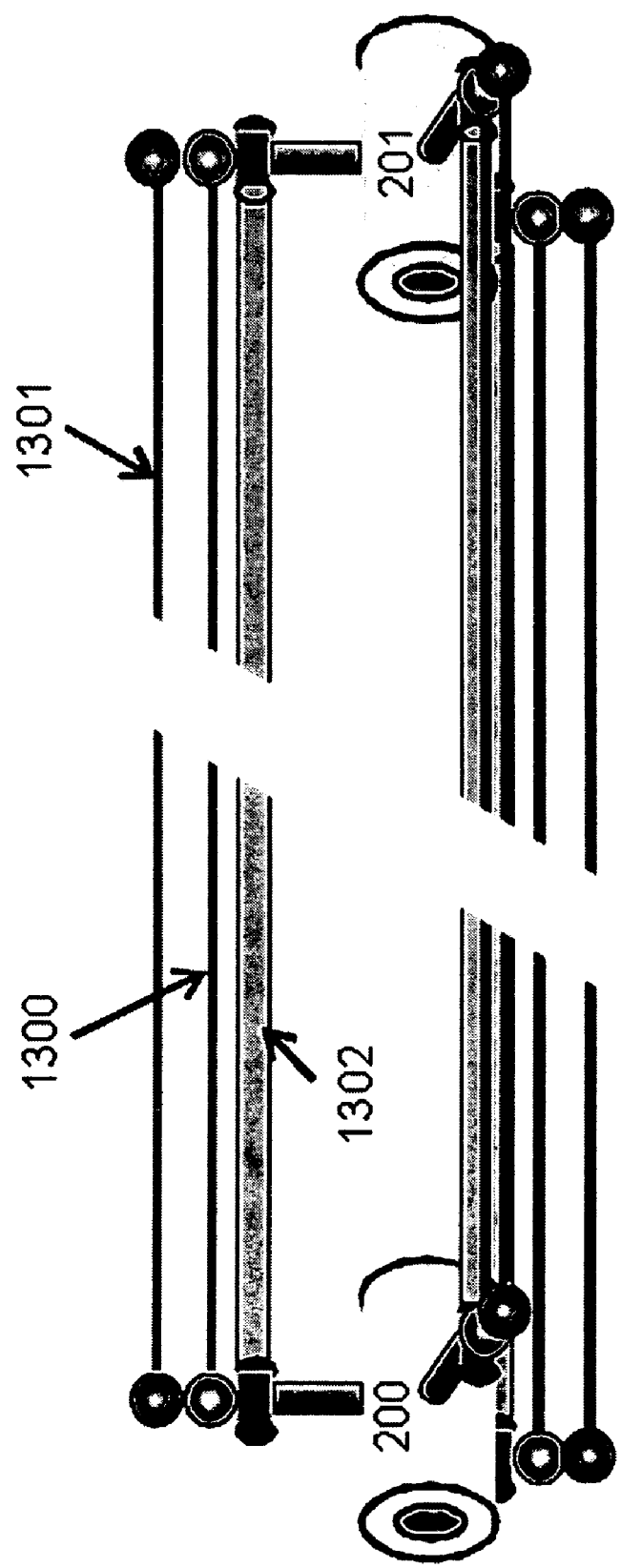
FIG. 13 is an illustration of a one-dimensional formation of two satellites in accordance with one embodiment.

FIG. 13 is an illustration of a one-dimensional formation of two satellites in accordance with one embodiment.

FIG. 13 discloses an interferometric ranging beam 1300, a tether 1301, a laser thrust beam 1302, a satellite 200, and a satellite 201. For example, the disclosed one-dimensional PTFF system can be used for a Fourier Transform X-Ray Spectrometer in space. An example of a one-dimensional PTFF system for such purpose is shown in FIG. 13, where ultrahigh precision is ensured with three laser thrusters, three tether systems, and three interferometric ranging systems. A Fourier Transform X-Ray Spectrometer can make a spectral diagnosis of hot, X-ray emitting, cosmic plasmas. In order to maintain an accurate separation of the X-ray telescope and the interferometer, we can use laser thrusters, tethers, and interferometry as discussed above.

What is claimed is:

1. A method to stabilize a distance between a first apparatus and a second apparatus, comprising:
    attaching a laser thrust system to said first apparatus and said second apparatus;
    activating said laser thrust system, wherein said laser thrust system provides a repelling force that repels said first apparatus and said second apparatus away from one another; and
    attaching a tether system to said first apparatus and said second apparatus, wherein said tether system provides an attracting force that attracts said first apparatus and said second apparatus towards one another,
    wherein said repelling force and said attracting force are substantially equal to stabilize said distance of said first apparatus and said second apparatus, and
    wherein attaching said laser thrust system to said first apparatus and said second apparatus comprises:
    attaching a laser to said first apparatus;
    attaching a first mirror to said first apparatus;
    attaching a second mirror to said second apparatus; and
    positioning said first mirror and said second mirror, wherein a laser beam generated by said laser transmits through a back of said first mirror to form an intracavity laser beam, and wherein said intracavity laser beam reflects off of a front of said first mirror and a front of said second mirror a plurality of times.

2. The method of claim 1, wherein attaching said laser to said first apparatus comprises:
    attaching a laser gain media to said laser thrust system; and
    positioning said gain media to amplify said laser beam.

3. The method of claim 2, wherein attaching said laser gain media to said laser thrust system comprises attaching said laser gain media to a back of said first mirror.

4. The method of claim 1, further comprising thermally maintaining a temperature of said first mirror.

5. The method of claim 1, further comprising shaping and positioning said first mirror and said second mirror to form a confocal resonator, wherein a radius of curvature of said first mirror and said second mirror is substantially equal to an ideal distance between said first mirror and said second mirror.

6. The method of claim 1, further comprising shaping and positioning said first mirror and said second mirror to form a parabolic resonator, wherein a focal length of said first mirror and said second mirror is substantially equal to an ideal distance between said first mirror and said second mirror.

7. The method of claim 1, further comprising shaping and positioning said first mirror and said second mirror to form a hemispherical resonator, wherein a focal length of said first mirror is substantially equal to an ideal distance between said first mirror and said second mirror.

8. The method of claim 1, further comprising shaping and positioning said first mirror and said second mirror to form a hemispherical resonator, wherein a focal length of said second mirror is substantially equal to an ideal distance between said first mirror and said second mirror.

9. The method of claim 1, further comprising:
    detecting a defect in a laser diode of said laser; and
    replacing a laser diode of said laser when a defect is detected in said laser diode.

10. The method of claim 9, further comprising attaching a carousel of laser diodes to said laser thrust system, wherein replacing a laser diode of said laser when a defect is detected in said laser diode further comprises replacing said laser diode of said laser with a laser diode from said carousel of laser diodes.

11. The method of claim 1, further comprising:
    attaching a laser power meter to said second apparatus; and
    positioning a lens between a back of said second mirror and said laser power meter, wherein a percentage of said intracavity laser beam transmits through said second mirror to form an extracavity laser beam, and wherein said extracavity laser beam is focused towards a receiving input area of said laser power meter.

12. A method to stabilize a distance between a first apparatus and a second apparatus, comprising:
    attaching a laser thrust system to said first apparatus and said second apparatus;
    activating said laser thrust system, wherein said laser thrust system provides a repelling force that repels said first apparatus and said second apparatus away from one another; and
    attaching a tether system to said first apparatus and said second apparatus, wherein said tether system provides an attracting force that attracts said first apparatus and said second apparatus towards one another,
    wherein said repelling force and said attracting force are substantially equal to stabilize said distance of said first apparatus and said second apparatus, and, wherein attaching a tether system to said first apparatus and said second apparatus comprises:
    attaching a tether to said first apparatus and said second apparatus; and
    attaching a piezoelectric translator to said tether for fine tuning an extended length of said tether.

13. The method of claim 12 wherein attaching a tether system to said first apparatus and said second apparatus further comprises attaching a stepper motor to said tether for coarse tuning an extended length of said tether.

14. The method of claim 12, wherein attaching a tether system to said first apparatus and said second apparatus further comprises attaching an inchworm motor to said tether for coarse tuning an extended length of said tether.

15. The method of claim 14, further comprising:
    attaching an electromechanical clamp to said tether for securing a length of said tether, and
    attaching an electromechanical damper to said tether for absorbing vibration energy of said tether.

16. The method of claim 14, further comprising:
    attaching an electromagnetic clamp to said tether for securing a length of said tether, and
    attaching an electromagnetic damper to said tether for absorbing vibration energy of said tether.

17. The method of claim 14, further comprising:
    attaching an electromechanical clamp to said tether for securing a length of said tether, and
    attaching an electromagnetic damper to said tether for absorbing vibration energy of said tether.

18. The method of claim 14, further comprising:
    attaching an electromagnetic clamp to said tether for securing a length of said tether, and
    attaching an electromechanical damper to said tether for absorbing vibration energy of said tether.

19. The method of claim 15, wherein said tether is wrapped around a reel.

20. The method of claim 1, further comprising:
    positioning a reflecting mirror behind a back of said second mirror, wherein a percentage of said intracavity laser beam transmits through said second mirror to form an extracavity laser beam;
    directing said extracavity laser beam towards an interferometer system with said reflecting mirror; and measuring said distance between said first apparatus and said second apparatus with said interferometer system.

21. The method of claim 20, further comprising adjusting said repelling force of said laser thrust system when said distance between said first apparatus and said second apparatus is not substantially equal to an ideal distance between said first apparatus and said second apparatus.

22. The method of claim 20, further comprising adjusting said attracting force of said tether system when said distance between said first apparatus and said second apparatus is not substantially equal to an ideal distance between said first apparatus and said second apparatus.

23. The method of clam 20, further comprising:
monitoring said distance between said first apparatus and said second apparatus with a computer system;
adjusting said repelling force of said laser thrust system when said distance between said first apparatus and said second apparatus is not substantially equal to an ideal distance between said first apparatus and said second apparatus; and
adjusting said attracting force of said tether system when said distance between said first apparatus and said second apparatus is not substantially equal to an ideal distance between said first apparatus and said second apparatus.

24. A satellite system, comprising:
a first satellite;
a second satellite, positioned opposite said first satellite;
a laser thrust system for providing a repelling force that repels said first satellite away from said second satellite; and
a tether system for providing an attracting force that attracts said first satellite towards said second satellite.

25. The satellite system of claim 24, wherein said laser thrust system comprises:
a laser pumping system adapted to generate a laser beam, attached to said first satellite;
a first mirror, attached to said first satellite, comprising a back side adapted to transmit said laser beam to form an intracavity laser beam, and a front side adapted to reflect said intracavity laser beam; and
a second mirror, attached to said second satellite, comprising a front side adapted to reflect said intracavity laser beam, wherein said intracavity laser beam reflects a plurality of times between said front side of said first mirror and said front side of said second mirror to generate said repelling force.

26. The satellite system of claim 25, wherein said first mirror and said second mirror are curved to form a confocal resonator and wherein a radius of curvature of said first mirror and said second mirror is substantially equal to an ideal distance between said first mirror and said second mirror.

27. The satellite system of claim 25, wherein said first mirror and said second mirror are curved to form a parabolic resonator, wherein a focal length of said first mirror and said second mirror is substantially equal to an ideal distance between said first mirror and said second mirror.

28. The satellite system of claim 25, wherein said first mirror is curved to form a hemispherical resonator, wherein a focal length of said first mirror is substantially equal to an ideal distance between said first mirror and said second mirror.

29. The satellite system of claim 25, wherein said second mirror is curved to form a hemispherical resonator, wherein a focal length of said second mirror is substantially equal to an ideal distance between said first mirror and said second mirror.

30. The satellite system of claim 25, wherein said laser pumping system comprises a laser gain media, wherein said laser gain media is positioned to generate optical gain for said laser beam.

31. The satellite system of claim 30, wherein said laser gain media is axially positioned between a generator of said laser beam and said back of said first mirror.

32. The satellite system of claim 30, wherein said laser gain media is attached to a back of said first mirror.

33. The satellite system of claim 32, wherein said laser pumping system further comprises a thermal management system for thermal regulation of said first mirror.

34. The satellite system of claim 30, wherein said laser gain media comprises a solid state laser crystal.

35. The satellite system of claim 34, wherein said solid state laser crystal is selected from a group consisting of Nd:YAG, Er:YAG, Nd:YLF, Nd:YCa4O, Nd:Glass, Ti:sapphire, Tm:YAG, Yb:YAG, Ho:YAG, Ce:LiCAF, U:CaF$_2$, Sm:CaF$_2$, and Nd:YVO$_4$.

36. The satellite system of claim 30, wherein said laser pumping system further comprises a laser diode for generating said laser beam.

37. The satellite system of claim 30, wherein said laser pumping system further comprises a carousel of replacement diodes for said laser diode.

38. The satellite system of claim 30, wherein said tether system comprises:
a tether, attached to said first apparatus and said second apparatus;
a reel, wherein said tether is at least partially wrapped around said reel;
a clamp, abutting said tether for preventing an extension of said tether; and
a motor, attached to said tether for adjusting a length of said tether.

39. The satellite system of claim 38, wherein said clamp comprises an electromechanical clamp.

40. The satellite system of claim 38, wherein said clamp comprises an electromagnetic clamp.

41. The satellite system of claim 38, wherein said motor comprises a coarse precision motor and a fine precision motor.

42. The satellite system of claim 41, wherein said coarse precision motor comprises a stepper motor and said fine precision motor comprises a piezoelectric translator.

43. The satellite system of claim 41, wherein said coarse precision motor comprises an inchworm, and said fine precision motor comprises a piezoelectric translator.

44. The satellite system of claim 38, wherein said tether system further comprises a damper.

45. The satellite system of claim 44, wherein said damper comprises an electromechanical damper.

46. The satellite system of claim 44, wherein said damper comprises an electromagnetic damper.

47. The satellite system of claim 38, wherein said tether comprises quartz, Kevlar, Vectran, carbon nanotubes, tungsten, and carbon fiber.

48. The satellite system of claim 38, further comprising an interferometry system.

49. The satellite system of claim 48, wherein said interferometry system comprises a mirror to deflect a percentage of said laser beam towards an interferometer.

50. The satellite system of claim 48, wherein said front of second mirror is adapted to transmit a percentage of said intracavity laser beam to form an extracavity laser beam, and wherein said interferometry system comprises a mirror to deflect a percentage of said extracavity laser beam towards an interferometer.

51. The satellite system of claim 50, wherein said interferometer comprises:
   a first interferometry partial mirror, attached to said second satellite, adapted to reflect a first percentage of said extracavity laser beam towards a second interferometry mirror, and transmit a second percentage of said extracavity laser beam towards a fourth interferometry partial mirror;
   a second interferometry mirror, attached to said first satellite, adapted to reflect said first percentage of said extracavity laser beam towards a third interferometry mirror;
   a third interferometry mirror, attached to said first satellite, adapted to reflect said first percentage of said extracavity laser beam towards said fourth interferometry partial mirror; and
   a fourth interferometry partial mirror, attached to said second satellite, adapted to reflect said second percentage of said extracavity laser beam towards a photodetector, and adapted to transmit said first percentage of extracavity laser beam towards said photodetector.

52. A method to stabilize a distance between a first apparatus and a second apparatus, comprising:
   attaching a laser thrust system to said first apparatus and said second apparatus, comprising
      attaching a first mirror to said first apparatus,
      attaching a second mirror to said second apparatus,
      attaching a laser to said first apparatus, comprising
         attaching a laser gain media to said first mirror, and positioning said gain media to amplify a laser beam,
         attaching a carousel of laser diodes to said laser, and
         shaping and positioning said first mirror and said second mirror to form a parabolic resonator, wherein a focal length of said first mirror and said second mirror is substantially equal to an ideal distance between said first mirror and said second mirror, wherein said laser beam generated by said laser transmits through a back of said first mirror to form an intracavity laser beam, and wherein said intracavity laser beam reflects off of a front of said first mirror and a front of said second mirror a plurality of times;
   activating said laser thrust system, wherein said laser thrust system provides a repelling force that repels said first apparatus and said second apparatus away from one another;
   thermally maintaining a temperature of said first mirror;
   detecting a defect in a laser diode of said laser;
   replacing a laser diode of said laser from said carousel of laser diodes when a defect in said laser diode is detected;
   attaching a laser power meter to said second apparatus;
   positioning a lens between a back of said second mirror and said laser power meter, wherein a percentage of said intracavity laser beam transmits through said second mirror to form an extracavity laser beam, and wherein said extracavity laser beam is focused towards a receiving input area of said laser power meter;
   attaching a tether system to said first apparatus and said second apparatus comprising
      attaching a tether to said first apparatus and said second apparatus,
      attaching a piezoelectric translator to said tether and to said second apparatus for fine tuning an extended length of said tether,
      attaching an inchworm motor to said tether and to said second apparatus for coarse tuning an extended length of said tether,
      attaching an electromechanical clamp to said first apparatus abutting said tether for securing a length of said tether,
      attaching an electromechanical damper to said first apparatus abutting said tether for absorbing vibration energy of said tether, and
      attaching a reel to said first apparatus, wherein said tether is at least partially wrapped around said reel, wherein said tether system provides an attracting force that attracts said first apparatus and said second apparatus towards one another, and wherein said repelling force and said attracting force are substantially equal to stabilize said distance of said first apparatus and said second apparatus;
   positioning a reflecting mirror behind a back of said second mirror, wherein a percentage of said intracavity laser beam transmits through said second mirror to form an extracavity laser beam;
   directing said extracavity laser beam towards an interferometer system with said reflecting mirror;
   measuring said distance between said first apparatus with said interferometer system;
   monitoring said distance between said first apparatus and said second apparatus with a computer system;
   adjusting said repelling force of said laser thrust system when said distance between said first apparatus and said second apparatus is not substantially equal to an ideal distance between said first apparatus and said second apparatus; and
   adjusting said attracting force of said tether system when said distance between said first apparatus and said second apparatus is not substantially equal to an ideal distance between said first apparatus and said second apparatus.

* * * * *